(12) United States Patent
Zhuang et al.

(10) Patent No.: US 12,451,596 B2
(45) Date of Patent: Oct. 21, 2025

(54) MICROSTRIP ANTENNA, ANTENNA ARRAY, RADAR, AND VEHICLE

(71) Applicant: CALTERAH SEMICONDUCTOR TECHNOLOGY (SHANGHAI) CO., LTD, Shanghai (CN)

(72) Inventors: Kaijie Zhuang, Shanghai (CN); Shan Li, Shanghai (CN); Zhefan Chen, Shanghai (CN); Xuejuan Huang, Shanghai (CN); Chenwu Yu, Shanghai (CN); Dian Wang, Shanghai (CN)

(73) Assignee: CALTERAH SEMICONDUCTOR TECHNOLOGY (SHANGHAI) CO., LTD, Shanghai (CN)

( * ) Notice: Subject to any disclaimer, the term of this patent is extended or adjusted under 35 U.S.C. 154(b) by 362 days.

(21) Appl. No.: 18/108,044

(22) Filed: Feb. 10, 2023

(65) Prior Publication Data

US 2023/0198134 A1    Jun. 22, 2023

Related U.S. Application Data

(63) Continuation of application No. PCT/CN2022/117041, filed on Sep. 5, 2022.

(30) Foreign Application Priority Data

| Nov. 1, 2021 | (CN) | .................... 202111282192.6 |
| Apr. 14, 2022 | (CN) | .................... 202210395195.9 |
| Jun. 7, 2022 | (CN) | .................... 202210638650.3 |

(51) Int. Cl.
*H01Q 1/32* (2006.01)
*G01S 13/931* (2020.01)
*H01Q 1/38* (2006.01)

(52) U.S. Cl.
CPC .......... *H01Q 1/3233* (2013.01); *G01S 13/931* (2013.01); *H01Q 1/38* (2013.01)

(58) Field of Classification Search
CPC ...... H01Q 1/3233; H01Q 1/38; H01Q 9/0421; H01Q 9/045; H01Q 13/206; H01Q 21/065;
(Continued)

(56) References Cited

U.S. PATENT DOCUMENTS

| 4,259,670 A | 3/1981 | Schiavone |
| 4,356,492 A | 10/1982 | Kaloi |

(Continued)

FOREIGN PATENT DOCUMENTS

| CN | 1455474 A | 11/2003 |
| CN | 1941506 A | 4/2007 |

(Continued)

OTHER PUBLICATIONS

Sathianathan, Design and Analysis of Symmetric and Asymmetric Series Feed Radar Antenna, IOSR Journal of Electronics and Communication Engineering, 2017, pp. 72-78.
(Continued)

*Primary Examiner* — Vladimir Magloire
*Assistant Examiner* — Naomi M Wolford
(74) *Attorney, Agent, or Firm* — BROOKS KUSHMAN P.C.

(57) ABSTRACT

A microstrip antenna, an antenna array, a radar, and a vehicle are provided. The microstrip antenna includes: a dielectric layer, and a metal layer and a ground plane layer disposed at two sides of the dielectric layer, wherein the metal layer includes a first radiation patch and a feeding portion; a length of a long side edge of the first radiation patch is determined based on an operating wavelength of the microstrip antenna, and a length of a short side edge of the
(Continued)

first radiation patch is smaller than the length of the long side edge; the feeding portion is coupled between a center position of the long side edge of the first radiation patch and a short side edge, and the feeding portion is configured to transmit a high frequency signal to the first radiation patch or to transmit a space radiation signal received by the first radiation patch.

19 Claims, 16 Drawing Sheets

(58) Field of Classification Search
CPC ........ H01Q 1/50; H01Q 21/0006; H01Q 1/48; G01S 13/931; G01S 7/03; G01S 7/02
See application file for complete search history.

(56) References Cited

U.S. PATENT DOCUMENTS

| | | | |
|---|---|---|---|
| 8,068,057 B2 | 11/2011 | Yamagajo et al. | |
| 8,193,990 B2 | 6/2012 | Nakabayashi et al. | |
| 10,218,082 B2 | 2/2019 | Zhao et al. | |
| 11,101,572 B2* | 8/2021 | Bily | H04W 16/28 |
| 11,139,556 B2* | 10/2021 | Huang | H01Q 13/10 |
| 11,539,139 B1* | 12/2022 | Cheng | H01Q 21/0037 |
| 2010/0231440 A1 | 9/2010 | Shijo et al. | |
| 2012/0112976 A1* | 5/2012 | Hayakawa | H01Q 9/045 343/843 |
| 2015/0255867 A1 | 9/2015 | Inoue et al. | |
| 2019/0067834 A1 | 2/2019 | Park et al. | |
| 2021/0313697 A1 | 10/2021 | Mak | |

FOREIGN PATENT DOCUMENTS

| | | |
|---|---|---|
| CN | 200947465 Y | 9/2007 |
| CN | 201508912 U | 6/2010 |
| CN | 102593559 A | 7/2012 |
| CN | 204118265 U | 1/2015 |
| CN | 207303357 U | 5/2018 |
| CN | 108832289 A | 11/2018 |
| CN | 208570944 U | 3/2019 |
| CN | 109633649 A | 4/2019 |
| CN | 110165413 A | 8/2019 |
| CN | 110401029 A | 11/2019 |
| CN | 210074171 U | 2/2020 |
| CN | 210430106 U | 4/2020 |
| CN | 111129757 A | 5/2020 |
| CN | 111211416 A | 5/2020 |
| CN | 212848783 U | 3/2021 |
| CN | 112993538 A | 6/2021 |
| CN | 113169459 A | 7/2021 |
| CN | 114784499 A | 7/2022 |
| CN | 114976616 A | 8/2022 |
| EP | 1936738 A1 | 6/2008 |
| GB | 8918993 | 10/1989 |
| GB | 2223130 A | 3/1990 |
| JP | 10685528 A | 3/1994 |
| JP | 2014107600 A | 6/2014 |
| TW | 1549366 B | 9/2016 |
| WO | 2021204362 A1 | 10/2021 |

OTHER PUBLICATIONS

European Search Report for EP Application No. 22798688.2-1205/PCT/CN2022117041, dated Jan. 31, 2024, 13 pages.
International Search Report for Application No. PCT/CN2022/117041, dated Nov. 28, 2022, 6 Pages (including English Translation).
First Office Action for Chinese Application No. 202210638650.3, dated Oct. 23, 2023, 19 Pages including English Translation.
CNIPA First Office Action in CN Application No. 202210395195.9 dated May 16, 2025 (23 pages, including English translation).

* cited by examiner

MICROSTRIP ANTENNA, ANTENNA ARRAY, RADAR, AND VEHICLE

CROSS-REFERENCE TO RELATED APPLICATIONS

This application is a continuation of International Application No. PCT/CN2022/117041 filed Sep. 5, 2022, which claims priority to Chinese patent application No. 202111282192.6 filed Nov. 1, 2021, and Chinese patent application No. 202210395195.9, filed on Apr. 14, 2022, and Chinese patent application No. 202210638650.3, filed on Jun. 7, 2022, which are hereby incorporated herein by reference in their entireties.

TECHNICAL FIELD

Embodiments of the present disclosure relate to antenna technology, and in particular, to a microstrip antenna, an antenna array, a radar, and a vehicle.

BACKGROUND

With the increasing development of science and technology, intelligent driving technology starts to become popular in daily life. Sensors play a key role in intelligent driving, and the sensors are channels for intelligent systems of automobiles to obtain external information. However, different application scenarios have different requirements for sensors. Because of requirements of installation position and probing function, an automotive angle radar often needs to achieve beam steering at a certain angle.

A traditional beam steering solution is to use multi-string antennas for beamforming, which requires an introduction of a power splitter to achieve multi-string antenna beamforming. The introduction of the power splitter increases complexity of angle radar design and will introduce additional losses.

SUMMARY

The following is a summary of the subject matter described in detail herein. This summary is not intended to limit the protection scope of the claims.

Embodiments of the present disclosure provide a beam steering antenna, an antenna array, a radar, and a vehicle, that can achieve beam steering with a relatively simple structure.

In a first aspect, an embodiment of the present disclosure provides a beam steering antenna, which includes a dielectric layer, a metal layer, and a ground plane layer, the metal layer and the ground plane layer are disposed at two sides of the dielectric layer, wherein the metal layer includes a first radiation patch and a feeding portion;

a length of a long side edge of the first radiation patch is determined based on an operating wavelength of the beam steering antenna, and a length of a short side edge of the first radiation patch is smaller than the length of the long side edge;

the feeding portion is coupled between a center position of the long side edge of the first radiation patch and a short side edge, and the feeding portion is configured to transmit a high frequency signal to the first radiation patch or to transmit a space radiation signal received by the first radiation patch.

In a second aspect, an embodiment of the present disclosure provides an antenna array, including: a plurality of beam steering antennas as described in any one of the first aspect, and each of the plurality of feeding portions of the plurality of beam steering antennas are connected.

In a third aspect, an embodiment of the present disclosure also provides a radar, including: antennas, a signal transceiving apparatus such as a transceiver connected with the antennas, configured to transmit a probing signal wave through a transmitting antenna in the antennas, receive an echo signal wave through a receiving antenna in the antennas, and output a baseband digital signal after processing the echo signal wave; the antennas include a beam steering antenna as described in any one of the first aspect or an antenna array as described in any one of the second aspect; wherein, the echo signal wave is formed by a reflection of the probing signal wave by a probed object.

In a fourth aspect, an embodiment of the present disclosure further provides a vehicle, including: a vehicle shell, a radar as described in the third aspect, and a control system of the vehicle; wherein, the vehicle shell is disposed with at least one mounting hole; an antenna contained in the radar sends out a probing signal wave and receives an echo signal wave through the mounting hole; the radar measures measurement information of the vehicle and an obstacle within a preset radiation angle range in a surrounding environment according to the probing signal wave and the echo signal wave, and outputs the measurement information; the control system of the vehicle is connected with the radar and is configured to provide warning information and/or control a drive system of the vehicle to perform safety emergency operation according to the measurement information.

In a fifth aspect, an embodiment of the present disclosure further provides an antenna, including: a patch-type radiation structure, including: a first radiation region and a second radiation region; a feeding structure, which feeds to the radiation structure from a feeding position of the radiation structure; wherein the first radiation region and the second radiation region are determined according to feeding of the feeding position so that current distributions in the radiation structure are different; under excitation of the feeding structure, the first radiation region and the second radiation region generate probing signal waves in a preset radiation angle range.

The embodiment of the present disclosure provides a beam steering antenna, including a dielectric layer, and a metal layer and a ground plane layer, the metal layer and the ground plane layer are disposed at two sides of the dielectric layer, wherein the metal layer includes a first radiation patch and a feeding portion; a length of a long side edge of the first radiation patch is determined based on an operating wavelength of the beam steering antenna, and a length of a short side edge of the first radiation patch is smaller than the length of the long side edge; the feeding portion is coupled between a center position of the long side edge of the first radiation patch and a short side edge, and the feeding portion is configured to transmit a high frequency signal to the first radiation patch or to transmit a space radiation signal received by the first radiation patch. For the above technical solution, the feeding portion coupled between a center position of a long side edge of a first radiation patch and a short side edge and the first radiation patch perform connection feeding or coupling feeding, which achieves offset feed of the first radiation patch, and a current distribution on the first radiation patch achieves conversion of electromagnetic waves with a plurality of radiation main directions, which achieves beam steering in a case of effectively reducing a size of an antenna.

An embodiment of the present disclosure also provides an antenna, an antenna assembly, a radar radio frequency front end, and an electronic device, which can reconfigure a beam and improve a coverage range of the antennas.

In a sixth aspect, an embodiment of the present disclosure provides a microstrip antenna, including: a dielectric layer, a ground plane layer, and a feeding layer; wherein one side of the dielectric layer is disposed with the ground plane layer, and the other side of the dielectric layer is disposed with the feeding layer; the feeding layer includes a radiator, a first feeding portion, and a second feeding portion; the first feeding portion is located at one side of a symmetry center of an edge of the radiator along a first direction, and the second feeding portion is located at the other side of the symmetry center of the edge of the radiator along the first direction, so that the radiator can generate high-order modal radiation under excitation of the first feeding portion or the second feeding portion; the first feeding portion and/or the second feeding portion are configured to transmit a radio frequency transmit signal to the radiator; or the first feeding portion and/or the second feeding portion are configured to output a radio frequency receive signal received by the radiator.

In a seventh aspect, an embodiment of the present disclosure provides an antenna array, including: a plurality of microstrip antennas as described in any one embodiment of the sixth aspect, wherein the plurality of microstrip antennas are connected according to respective feeding portions to form a cascading mode.

In an eighth aspect, an embodiment of the present disclosure provides an antenna assembly, including: an microstrip antenna as described in any embodiment of the present disclosure and an antenna feeding network; wherein, the antenna feeding network is configured to convert a received first radio frequency signal into second radio frequency signals whose transmission amplitudes and/or phases are not completely consistent with the first radio frequency signal, and input them to different feeding portions of the antenna respectively.

In a ninth aspect, an embodiment of the present disclosure provides a radar radio frequency front end, including: an antenna assembly as described in the above example and a radar radio frequency transceiver, wherein an antenna feeding network of the antenna assembly is connected between the microstrip antennas of the antenna assembly and the radar radio frequency transceiver; the antenna feeding network is configured to transmit a signal transmitted by the radar radio frequency transceiver to a first feeding portion and a second feeding portion of the microstrip antennas, or to transmit a signal received by a first feeding portion and a second feeding portion of the microstrip antennas to the radar radio frequency transceiver.

In a tenth aspect, an embodiment of the present disclosure provides a radar radio frequency front end, including an antenna array and a radar radio frequency transceiver; wherein the antenna array includes a plurality of microstrip antennas; a microstrip antenna includes: a radiation portion, a first feeding portion, and a second feeding portion; the first feeding portion and the second feeding portion feed in the radiation portion, so that the radiation portion forms radiation of a high-order mode under excitation of the first feeding portion or the second feeding portion; the radar radio frequency transceiver is coupled to the antenna array, and is configured to transmit a radio frequency transmit signal to the first feeding portion and/or the second feeding portion of a corresponding antenna; and to receive a radio frequency receive signal transmitted by the first feeding portion and/or the second feeding portion of the antenna; the radar radio frequency transceiver adjusts an amplitude and/or a phase of the transmitted radio frequency transmit signal, and the microstrip antenna operates in different modes.

In an eleventh aspect, an embodiment of the present disclosure provides an electronic device, including: a radar radio frequency front end as described in any embodiment of the tenth aspect, wherein an antenna array in the radar radio frequency front end sends out a probing signal wave and receives an echo signal wave; and a signal processing apparatus, connected with the radar radio frequency front end, and configured to perform signal processing of baseband digital signals for determining measurement information with an object.

For the technical solution of the embodiment of the present disclosure, it is through a dielectric layer, a ground plane layer, and a feeding layer; wherein one side of the dielectric layer is disposed with the ground plane layer, and the other side of the dielectric layer is disposed with the feeding layer; the feeding layer includes a radiator, a first feeding portion, and a second feeding portion; the first feeding portion is located at one side of a symmetry center of an edge of the radiator along a first direction, and the second feeding portion is located at the other side of the symmetry center of the edge of the radiator along the first direction, so that the radiator can generate high-order modal radiation under excitation of the first feeding portion or the second feeding portion; the first feeding portion and/or the second feeding portion are configured to transmit a radio frequency transmit signal to the radiator; or the first feeding portion and/or the second feeding portion are configured to output a radio frequency receive signal received by the radiator. For the technical solution of the embodiment of the present disclosure, the first feeding portion and the second feeding portion transmit signals which are not completely the same to the radiator, which can achieve reconstruction of a beam, and improve a coverage range of an antenna. It effectively avoids problems caused by using multiple-string antennas for beamforming, for example, increasing design complexity and cost of a system, needing to introduce a power splitter to achieve a series connection of antennas, thereby resulting in additional losses, and so on.

It should be understood that the content described in this section is not intended to identify key or important features of embodiments of the present disclosure nor is it intended to limit the scope of the present disclosure. Other features of the present disclosure will be readily understood by the following specification.

Other aspects will become apparent after reading and understanding the drawings and detailed description.

BRIEF DESCRIPTION OF DRAWINGS

In order to more clearly explain technical solutions in embodiments of the present disclosure, drawings required to be used in descriptions of embodiments will be briefly described below, and it will be apparent that the drawings described below are only some embodiments of the present disclosure, from which other drawings may be obtained without paying creative efforts by those of ordinary skill in the art.

DETAILED DESCRIPTION

Figure 1:
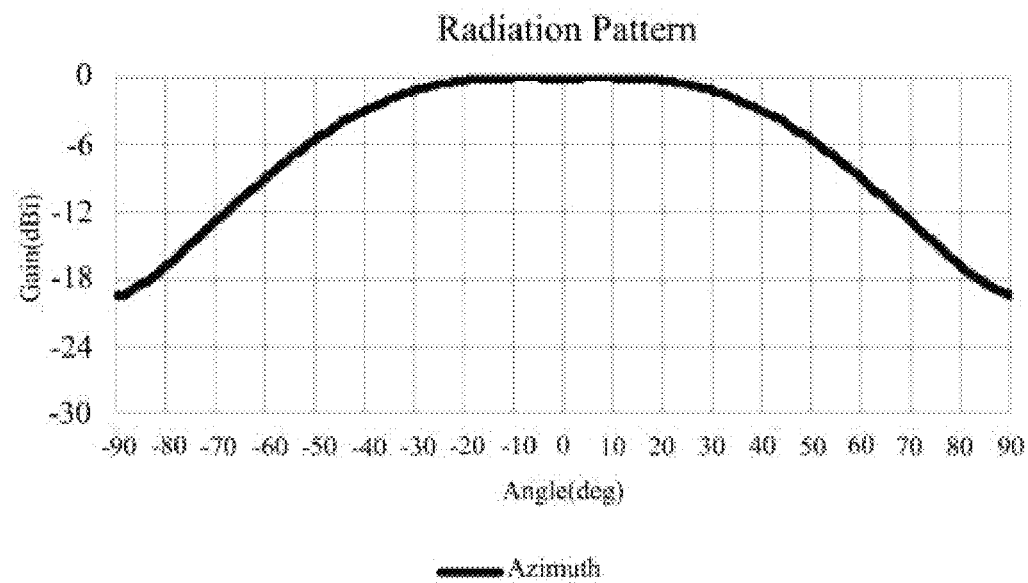
FIG. 1 is a diagram for a radiation angle-gain distribution of a radar.

The present disclosure is described in further detail below in conjunction with the accompanying drawings and embodiments. It can be understood that the embodiments described herein are intended only to explain and not to limit the present disclosure. In addition it should also be noted that for convenience of description only a portion of a structure related to the present disclosure is shown in the drawings and not the entire structure.

In this context, the term "and/or" is merely an association relationship that describes associated objects, indicating that there may be three relationships, for example, A and/or B, which may indicate three situations: A alone, A and B simultaneously, and B alone.

The terms "first" and "second" and the like in the specification of the present disclosure and in the drawings are used to distinguish between different objects, or to distinguish between different treatments of a same object, and are not used to describe a particular order of objects. It should be understood that data used in this way may be interchanged where appropriate, so that the embodiments of the present disclosure described herein can be implemented in an order other than those illustrated or described herein.

In addition, the terms "including" and "having" and any variations thereof referred to in the description of the present disclosure are intended to cover non-exclusive inclusion. For example, a process, a method, a system, a product, or a device including a series of acts or units is not limited to listed acts or units, but optionally also includes other acts or units not listed, or optionally also includes other acts or units inherent to such the process, the method, the products, or the device.

The term "coupled" or "coupling" may have several different meanings depending on the context in which the term is used. For example, the term coupling may have the meaning of mechanical coupling or electrical coupling. As used herein, the term "coupled" or "coupling" may indicate that two elements or devices may be connected to each other directly or through one or more intermediate elements or devices via an electrical element, an electrical signal, or a mechanical element (e.g., but not limited to, for example, a wires or a cable, depending on a practical application). Examples of coupling described herein include: a direct electrical connection, an inductive connection, or an optical coupling connection. For example, an electrical connection between two electrical devices is achieved by using a connection mode used in a semiconductor manufacturing process. For another example, a signal connection between two electrical devices is achieved by using a non-contact connection mode such as an optical coupling component or an inductance induction component, etc. For yet another example, an electrical connection or a signal connection between two electrical devices is assisted by using a connection mode between chip pins and slots.

Before discussing exemplary embodiments in more detail, it should be mentioned that some of the exemplary embodiments are described as processing or methods depicted as flowcharts. Although a flowchart describes various operations (or acts) as sequential processing, many of these operations may be implemented in parallel, concurrently, or simultaneously. In addition, an order of the various operations may be rearranged. The processing may be terminated when its operation is completed, but may also have additional acts not included in the drawings. The processing may correspond to a method, a function, a procedure, a subroutine, a subprogram, or the like. In addition, embodiments in the present disclosure and features in the embodiments may be combined with each other if there is no conflict.

It should be noted that in embodiments of the present disclosure, the word "exemplary" or "for example", etc. are used to be indicated as examples, example illustrations, or illustrations. Any embodiment or design solution described as "exemplary" or "for example" in the embodiments of the present disclosure should not be construed as being more preferred or advantageous than other embodiments or design solutions. To be exact, the use of the word "exemplary" or "for example", etc. is intended to present related concepts in a concrete manner.

In the description of the present disclosure, "a plurality of" means two or more than two unless otherwise stated.

Through electromagnetic conversion, antennas may convert changed electrical signals e.g. radio frequency signals provided by a signal transmitter into electromagnetic waves and radiate them to a free space; and may convert electromagnetic waves in a specific frequency band in the free space into changed electrical signals and output them to a signal receiver.

In order to achieve electromagnetic conversion, the antenna includes a radiation portion and a feeding portion. The feeding portion is coupled between a signal transceiver (e.g. a signal transmitter and/or a signal receiver) and the radiation portion for transmitting changed electrical signals. For example, the feeding portion transmits the changed electrical signals outputted by a signal generator to the radiation portion, so that the radiation portion generates electromagnetic waves using the changed electrical signals and radiates them into the free space. For another example, the radiation portion converts electromagnetic waves from the free space into changed electrical signals, and transmits them to the signal receiver through the feeding portion.

In order to reduce a size of the antenna, the feeding portion may be coupled with the radiation portion by using a plurality of structures that can be constructed by an integrated circuit structure. The radiation portion is usually achieved in a metal layer in an integrated circuit in a patterned form. The radiation portion includes at least one radiation structure. For example, the radiation structure includes: an open circuit structure formed with a patterned metal layer to generate electromagnetic waves. Considering a conversion efficiency of an electrical field and a magnetic field, the radiation structure may include, for example, forming the metal layer in a rectangular envelope profile, wherein a width between two radiation edges of the metal layer is related to a wavelength λg of a guided wave in a medium. For example, according to a structure design of the radiation structure, the width may be determined based on n/2 of the wavelength λg, wherein n is a positive integer. The wavelength λg is, for example, a center wavelength of a frequency conversion wave or a wavelength of a fixed frequency wave, in relation to a frequency band of an electromagnetic wave radiated and/or received by a radio device on which the antenna is located.

The feeding structure is coupled between the signal transceiver (e.g. the signal transmitter and/or the signal receiver) and the radiation structure for transmitting changed electrical signals. For example, the feeding structure transmits changed electrical signals outputted by the signal transmitter to the radiation structure, so that the radiation structure generates electromagnetic waves using the changed electrical signals. For another example, the radiation structure converts electromagnetic waves from the free space into changed electrical signals, and transmits them to the signal receiver through the feeding structure. In order to reduce an overall size of the antenna, making a structure more compact to achieve a miniaturized antenna, the feeding structure may be coupled with the radiation structure by using the plurality of structural modes that can be constructed by the integrated circuit structure. The feeding structure may adopt a coaxial transmission structure or a microstrip transmission structure. For example, the feed structure includes a microstrip line. For another example, the feeding structure includes: a via hole for achieving cross-layer, and a signal line located in the via hole, wherein a height of the via hole is not higher than a length of the signal line, so that the signal line is connected with the radiation structure; a hole wall of the via hole may be coated with a metal layer to be as a metal stratum, and the signal line has no contact with the via hole. The feeding structure may alternatively adopt an inductive coupling mode to achieve a purpose of feeding to the radiation portion. For example, a surface of the radiation portion is excited to generate changed electrical signals by using a mode of a resonant cavity or an electrical field induction, thus making the radiation portion to generate electromagnetic waves.

The antenna may be integrated in a packaging body of a chip or disposed with a chip on a same PCB board to achieve integration of the antenna and the chip. The chip is a semiconductor element including the signal transmitter and/or the signal receiver.

For convenience of description, the antenna mentioned in any example of the present disclosure is a single-channel antenna in an antenna array such as a transmit antenna Tx or a receive antenna Rx. The antenna array may include at least one channel of antenna. The antenna array may include a plurality of channels of antennas. For example, the antenna array includes a plurality of channels of receive antennas Rx or a plurality of channels of transmit antennas Tx. For another example, the antenna array includes one channel of receive antenna Rx and one channel of transmit antenna Tx. For another example, the antenna array includes a plurality of channels of receive antennas Rx and one channel of transmit antenna Tx. A technical solution about the antenna array is described in detail in the following examples.

In some embodiments, a structure of the antenna includes a patch structure integrated in an integrated circuit. For example, the radiation portion includes a radiation structure with a rectangular envelope shape disposed in the metal layer, the radiation structure includes two radiation edges and two opposite non-radiation edges in the rectangular envelope shape. One of the radiation edges is connected with the feeding portion to distribute currents between the two radiation edges. The radiation edge connected with the feeding portion is also called a feed line edge. For example, a distance between the two radiation edges is about ½ of the wavelength of the guided wave in the medium. The feeding portion adopts, for example, any of the above structures to electrically connect the radiation portion with the signal transmitter (or the signal receiver).

In some other embodiments, the structure of the antenna includes a structure integrated in the integrated circuit based on gap radiation. The radiation portion includes a metal layer with gaps, and electromagnetic waves are generated when the metal layer is fed with high-frequency currents by using a current open circuit formed by the gaps. A position, a shape, and a direction, etc. of the gaps affect a radiation mode of the generated electromagnetic waves. The radiation mode includes, for example, a radiation direction and/or a radiation power, etc. The shape of the gaps is, for example, a slot. A length of a long edge of the slot is, for example, about half of the wavelength of the guided wave in the medium. The feeding portion may achieve feeding of the radiation portion through at least one of the microstrip line, the guided wave, or the resonant cavity.

With the application of auto-assisted driving technology, a control system of a vehicle needs to acquire a physical quantity of an obstacle in an environment near a corner of the vehicle, so as to provide an assistant drive function or a warning prompt, etc. according to a corresponding surrounding environment. For this reason, a corresponding measurement sensor, such as a radar, needs to provide an angle range which conform to a corresponding function of the control system, and measurement information (i.e., the physical quantity) probed within a measurement distance range.

For this reason, the measurement sensor, such as the radar, requires a radiation angle range of the antenna and a radiation direction within the radiation angle range. For example, in order to be applicable to a requirement of a measurement direction required in automobile automatic driving, the radiation angle range of the radar is, for example, not less than a range of 90° based on the radiation direction. For this reason, energies radiated by antennas assembled in some radars, for example, in a direction of ±45°, meet requirements of signal receivers for echo signal detection. For example, a diagram of a radiation angle-gain distribution as shown in FIG. 1 is formed, wherein a corresponding radiation angle range of an azimuth represented by a solid line is about ±40° within a range of energies not less than 3 dB.

The above automobile example is only an example. For some autonomous mobile robots, the radiation angle range may be larger or smaller depending on their application environments and/or assembly positions.

Figure 2:
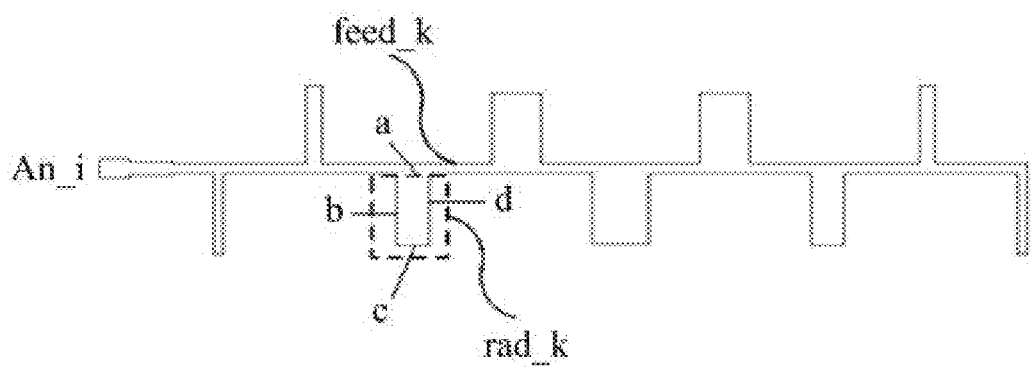
FIG. 2 is a schematic diagram of an antenna structure.

FIG. 2 is a schematic diagram of an antenna structure. As shown in FIG. 2, a narrow edge of each radiation structure rad_k in a single-channel antenna An_i is connected with a corresponding feeding structure feed_k, so that same-direction currents are distributed in the corresponding radiation structure. Probing signal waves are generated by using change of the same-direction currents in each radiation structure. This antenna structure requires a plurality of strings of antennas as shown in FIG. 2, and a power and a corresponding phase ratio are adjusted by a power splitter, so as to provide electromagnetic waves that conform to a requirement of the radiation angle range. The radiation structure rad_k includes two radiation edges a and c, and two opposite non-radiation edges b and d, and in this example, a length of a radiation edge is smaller than a length of a non-radiation edge and it is called a narrow edge. The narrow edge connected with the feeding structure feed_k is the radiation edge a in the figure, also called a feed line edge.

However, affected by a differentiation factor of individual sensor manufacturing, too few antennas are not conducive to obtaining electromagnetic waves conforming to a preset radiation angle range, while too many antennas are not conducive to achieving greatly reducing of sizes of the antennas. Still taking FIG. 1 as an example, if a waveform of a wide beam or beam steering is achieved, the antenna needs the power splitter for power and phase coordination. However, an accuracy of the power splitter is often affected by a precision of processing and manufacturing, which reduces an overall accuracy of the antenna. At the same time, a large quantity of antennas is not conducive to reducing an expectation of the sizes of the antennas.

In order to further reduce the size of the antenna and improve a radiation efficiency of the single-channel antenna, an embodiment of the present disclosure provides a microstrip antenna (e.g., a beam steering antenna), wherein the microstrip antenna is based on a patch structure and may be integrated in an integrated circuit. Taking the microstrip antenna as the beam steering antenna as an example, the beam steering antenna generates a relatively wide beam of electromagnetic waves by changing a current distribution in a radiation structure and using different current directions generated by a single radiation structure.

The microstrip antenna of the embodiment of the present disclosure will be described in detail below with reference to the accompanying drawings.

Figure 3:
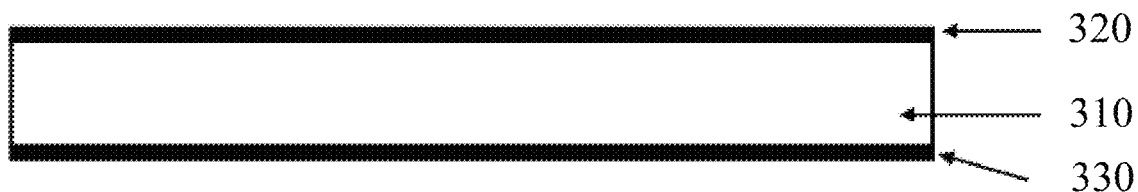
FIG. 3 illustrates schematically a side view of a beam steering antenna.

FIG. 3 is a side view of a beam steering antenna according to an embodiment of the present disclosure. As shown in FIG. 3, the beam steering antenna includes: a dielectric layer 310 and a metal layer (or called a feeding layer) 320 and a ground plane layer 330, the metal layer 320 and the ground plane layer 330 are disposed at two sides of the dielectric layer 310, wherein the metal layer 320 is located at one side of the dielectric layer 310, the ground plane layer 330 is located at one side of the dielectric layer 310 away from the metal layer 320, and the metal layer 320 includes a first radiation patch 3210 and a feeding portion 3220; the first radiation patch 3210 includes at least one long side edge (or called a first side edge, or a long edge, or a first edge) and one short side edge (or called a second side edge, or a short edge, or a second edge) adjacent to the long side edge, a length of the long side edge of the first radiation patch 3210 is determined based on an operating wavelength of the beam steering antenna, and a length of the short side edge of the first radiation patch 3210 is smaller than the length of the long side; the feeding portion 3220 is coupled between a center position of the long side edge of the first radiation patch 3210 and a short side edge, that is, the feeding portion 3220 is coupled to one long side edge of the first radiation patch 3210 and a coupling position is deviated from an axis perpendicular to the long side edge, and the feeding portion 3220 is configured to transmit high frequency signals to the first radiation patch 3210 or to transmit signals come from spatial radiation signals received by the first radiation patch 3210. The first radiation patch 3210 is a patch-type radiation structure. The feeding portion 3220 is a hardware portion of the feeding structure that feeds to the radiation structure, and is coupled with a radio frequency signal transmission structure such as a microstrip line for the radiation structure to achieve electromagnetic energy conversion.

Exemplarily, the metal layer 320 includes a radiation structure (or called a radiator) and a feeding structure, wherein the radiation structure may be a patterned metal layer such as the first radiation patch 3210, and the feeding structure may be the feeding portion 3220. The first radiation patch 3210 is, for example, a rectangular radiation patch having a rectangular envelope profile, including two long side edges and two short side edges, wherein a length W of a long side edge may be determined based on the operating wavelength of the beam steering antenna and the length W of the long side edge may be an operating wavelength λg; a length L of a short side edge is smaller than the length W of the long side edge, and the length L of the short side edge is, for example, half of the operating wavelength, i.e. ½ λg.

The rectangular envelope profile described above is for illustration only, and in another example, the radiation structure may be another shape, for example, a trapezoid, a parallelogram, or other quadrilateral shapes, and for another example, it may be a symmetric pentagon or hexagon or the like.

The long side edges and the short side edges are edges set based on a rectangular shape formed along an envelope profile edge of the first radiation patch 3210. For example, the long side edge corresponds to a radiation edge in the radiation structure, and the short side edge corresponds to a non-radiant edge in the radiation structure.

Taking the radiation structure of the antenna including a metal layer of the rectangular envelope profile as an example, the rectangular envelope profile of the radiation structure includes a first edge (with a length of W) and a second edge adjacent thereto (with a length of L). The first edge is not shorter than the second edge. The first edge of the radiation structure is disposed with a feeding position and is connected with the feeding structure. Different from the feeding mode shown in FIG. 2, the current directions in the radiation structure are no longer the same, but different current distributions are produced by feeding with the long side edge of the radiation structure. That is, the current distribution forming the first radiation region is different from the current distribution of the second radiation region. Affected by a relative position relationship between the feeding position and the second edge, the current distributions of the corresponding first radiation region and the second radiation region can not only change the current direction, but also change current distribution areas of the two regions. Related to another structure disposed within the first radiation region or the second radiation region, the current distributions of the two regions may further have different current directions and current densities, etc.

Figure 4:
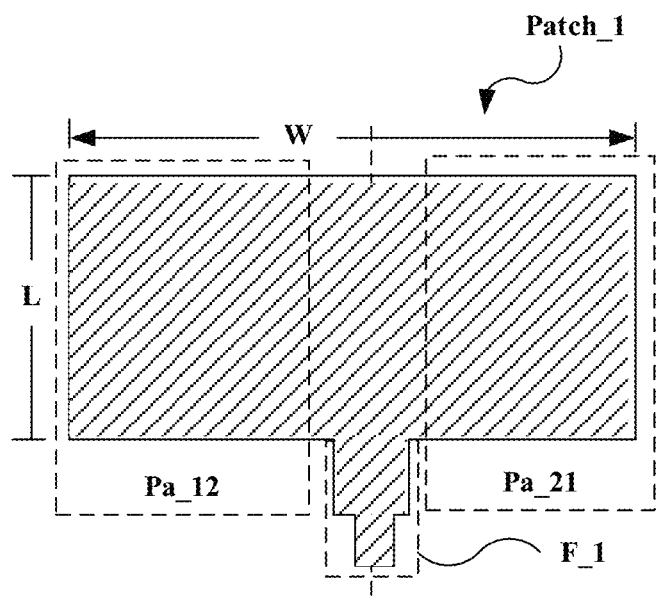
FIG. 4 is a schematic diagram for another antenna structure.
Figure 5:
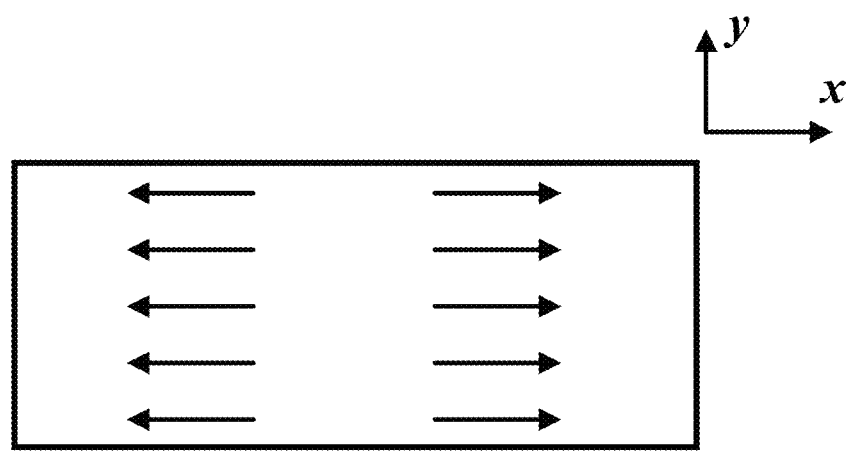
FIG. 5 illustrates a schematic diagram of a current distribution corresponding to the antenna structure of FIG. 4.

For example, please refer to FIG. 4 and FIG. 5, which respectively show a structure of an antenna and a corresponding schematic diagram of a current distribution. The antenna shown in FIG. 4 is also called TM20 mode antenna. The length L of the first edge is about twice the length W of the second edge. The first edge and the second edge are determined according to the wavelength λg. The feeding position is located near a symmetry axis of the first edge of the rectangular envelope profile of the radiation structure. Because the feeding position is located near the symmetry axis of the first edge of the rectangular envelope profile of the radiation structure, in the radiation structure as shown in FIG. 4, the current directions of the first radiation region and the second radiation region are opposite respectively. Affected by the feeding position near the symmetry axis, two basically symmetrical radiation main directions are formed within the radiation angle range.

Figure 6A:
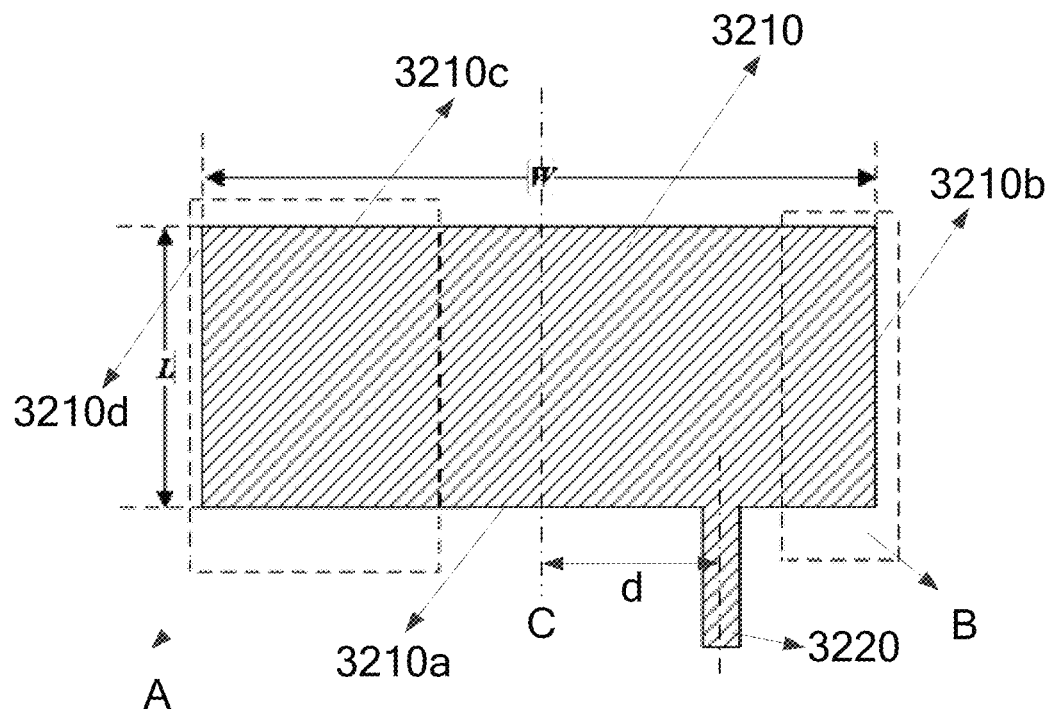
FIGS. 6A to 6B are schematic diagrams for two structures of a beam steering antenna.

FIG. 6A is a schematic diagram of a structure of a beam steering antenna according to an embodiment of the present disclosure. As shown in FIG. 6A, the radiation patch 3210 includes long side edges 3210a and 3210c and short side edges 3210b and 3210d. In an embodiment, a feeding portion 3220 is disposed between a central position (an intersection of a symmetry axis C and a long side edge 3210a in the figure) of one long side edge (e.g. 3210a in the figure) therein and a short side edge (e.g. 3210b in the figure), that is, the feeding portion 3220 is coupled to the long side edge 3210a, and a coupling position is deviated from the symmetry axis C perpendicular to the long side edge 3210a, for example, the coupling position may be located between the symmetry axis of the long side edge of the rectangular envelope profile of the radiation structure and the short side edge adjacent to the long side edge, and the feeding portion 3220 is electrically connected with the first radiation patch 3210. Because a feeding position of the radiation patch 3210 is deviated from the center position of a long side edge of the radiation patch 3210, so that the feeding portion 3220 achieves feeding of the first radiation patch 3210 in an offset feed mode, the feeding position is located on the long side edge of the radiation patch 3210 and deviated from the center position of the long side edge. The feeding position is a position at which the feeding structure is coupled with the radiation structure.

Figure 6B:
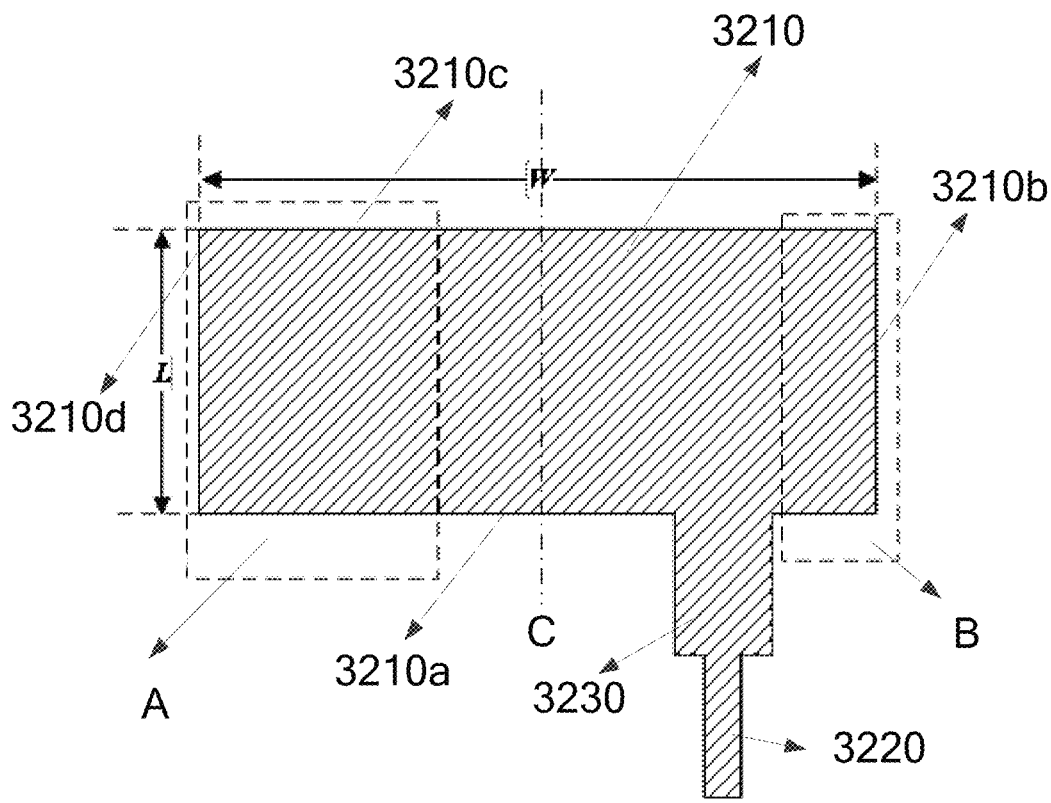
Figure 7:
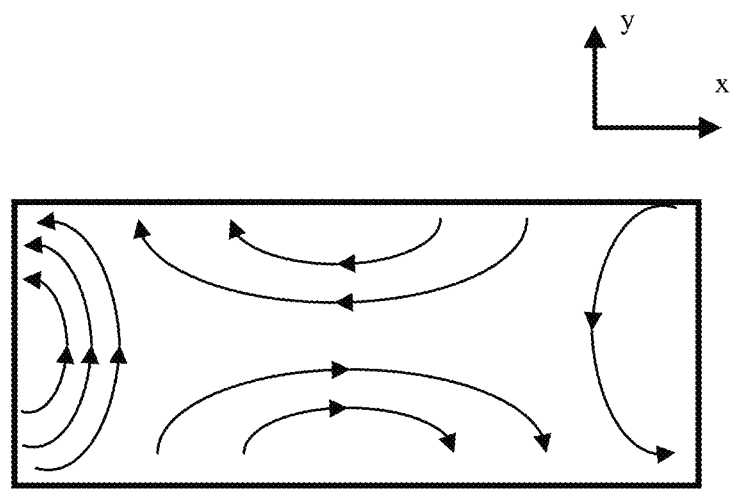
FIG. 7 illustrates a diagram of a current distribution of the beam steering antenna of FIG. 6.

FIG. 7 is a diagram of a current distribution of a beam steering antenna provided in FIG. 6. A current distribution of the beam steering antenna as described in the previous structure is shown in FIG. 7 in a process of transmitting high frequency signals to the first radiation patch based on the feeding portion or transmitting spatial radiation signals received by the first radiation patch based on the feeding portion. At this time, the antenna may operate in a high-order mode (such as TM11 mode), so the antenna shown in FIG. 4 may also be called TM11 mode antenna. A far-field pattern of the TM11 mode is null steering in the middle and convex at two edges in an xoz plane, and a polarization direction is a y direction.

For ease of description, according to a current phase of the first radiation patch associated with a phase of a radiation field, as shown in FIG. 6A, the first radiation patch includes a first radiation region A and a second radiation region B, as shown in FIGS. 6A and 7, current directions of the first radiation region A and the second radiation region B are different and areas of current distributions are also different. Affected by that the feeding portion is inclined to the second radiation region B (the feeding position is deviated from the symmetry axis), two radiation main directions are formed asymmetric radiation gains within the radiation angle range.

In an exemplary embodiment, a division of the first radiation region and the second radiation region may be determined not only according to different current distributions resulting from a mode in which the feeding structure and the radiation structure are electrically connected; or it may be determined according to different distributions of induced currents generated by fed high frequency currents on the radiation structure. Different from the antenna structure shown in FIG. 4, the feed structure is located at one side of the short edge and there is a gap between the feed structure and the short edge, so that the feed structure feeds the radiation structure in an inductive coupling mode. The length W of the long edge of the radiation structure may be about 2 λg. With this feeding mode, the current distributions of the radiation structure may be referred to FIG. 7. Correspondingly, the first radiation region and the second radiation region are determined according to different directions and/or different current densities of the induced currents.

The current distributions in the radiation structure are different according to the feeding of the feeding structure. The current distribution is a charge flow generated on a surface of the radiation structure in a process of feeding of the high-frequency signals, and includes at least one of the current direction, the current density, the current distribution area, etc. Thereby, the first radiation region and the second radiation region may be determined based on a hardware structure disposed on the patterned metal layer such that the current distributions of the entire radiation structure are different, for example, the radiation structure may be divided into the first radiation region and the second radiation region according to the feeding of the feeding position such that the current distributions in the radiation structure are different. In another example, the first radiation region and the second radiation region may be determined according to a relationship between a size of the radiation structure and a wavelength such that the current distributions are different, that is, because the current distributions are made to be different depending on the relationship between the size of the radiation structure and the wavelength, the first radiation region and the second radiation region may be determined according to the different current distributions.

In this example, the current directions in the first radiation patch are no longer in a same direction, but different current distributions are generated by feeding with the long side edges (as 3210a and 3210c in FIG. 6A) of the first radiation patch. That is, the current distribution forming the first radiation region is different from the current distribution of the second radiation region. Affected by a relative positional relationship between the feeding portion and the long side edge, the corresponding current distributions of the first radiation region and the second radiation region not only change the current directions, but also change the current distribution areas of the two regions. Related to other structures disposed within the first radiation region or the second radiation region, the current distributions of the two regions may have different current directions and current densities, etc.

In order to make the first radiation patch be excited to be, e.g., in the TM11 mode, an offset feed distance d (or called a feeding distance) between the feeding portion 3220 and the center position of the long side edge of the first radiation patch is larger than a quarter of the length of the long side edge, that is, d>¼ λg. For example, the feeding portion also has a symmetrical structure, and an offset feed distance between a center position of the feeding portion and a center position of the first radiation patch is d. In a practical application, a current distribution of the beam steering antenna may be adjusted by adjusting the feeding distance. Changing the feeding distance may increase a component of the TM11 mode and achieve polarization in one Y-axis direction; in addition, due to offset feed, the current distributions of the first radiation patch at two sides of the feeding portion is asymmetrical, and a main beam points to a negative angle, thus improving a gain of the beam steering antenna in a main beam direction.

The plurality of structures described above allowing the current distributions of the first radiation region and the second radiation region to be different are not limited. And offset feed positions of the radiation patch and the feeding portion are not limited to the illustration. According to requirements of various performance indices of actual antennas, the above structures may be used in combination or matched with another structure. For another structure, a matching structure 3230 (e.g. as shown in FIG. 6B) disposed on the radiation patch for impedance matching, or the like, is taken as an example.

In order to meet an engineering requirement of efficient achieving transmission and/or reception of electromagnetic waves in an actual operation running process of a radio device in which the antenna is located, a small antenna further needs to meet at least one of the following performance indices in engineering: impedance matching, beam width, and antenna gain, etc. Therefore, the antenna structure may correspondingly affect one or more performance indices. For example, the antenna gain may be effectively improved by adjusting impedance matching. For another example, an increase of antenna gain in a certain radiation direction may narrow of the beam width and so on.

FIG. 6B is a schematic diagram of a structure of another beam steering antenna according to an embodiment of the present disclosure. As shown in FIG. 6B, a matching structure 3230 may be disposed between the first radiation patch 3210 and the feeding portion 3220, and configured to perform impedance matching between the feeding portion 3220 and the first radiation patch 3210 to provide matching to achieve 50 ohms. Impedance matching refers to a suitable match that is reached between a signal source or a transmission line and a load, which may be reflected in such aspects as an Isolation of the antenna, a standing wave index, or return loss performance, etc. Impedance matching is not only related to a propagation medium of electromagnetic waves, but also related to impedance matching of a feed line structure and the radiation structure. For this reason, an impedance of each radiation patch of the beam steering antenna may be set according to an impedance of the propagation medium; and a resistor may be disposed in the beam steering antenna, so that an equivalent impedance of the feeding portion is adapted to an equivalent impedance of the radiation patch. The matching structure 3230 may be a portion of the feeding portion 3220 which may be an independent device designed using a semiconductor material; or a purpose of impedance matching is achieved by changing a size, a shape, or the like of a metal material in the feeding portion 3220 and using a conductive performance of the metal material in the feeding portion 3220. Taking FIG. 6B as an example, the matching structure 3230 in the feeding portion 3220 includes: a portion extending by using the size of the metal material to connect the microstrip line to the feeding position.

By setting a matching structure on the feeding portion, a radiation efficiency of the beam steering antenna can be effectively improved. The beam steering antenna with the matching structure has a better overall performance. For example, a performance of radiation direction is optimized, and a performance index such as return loss or the like is reduced.

Figure 8:
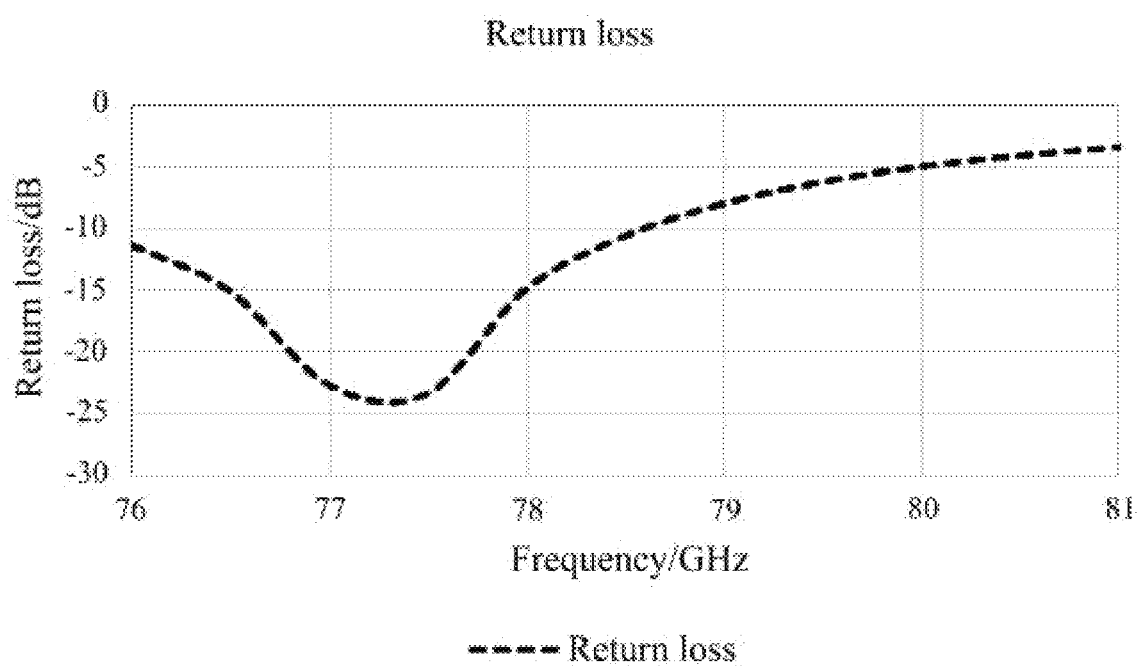
FIG. 8 illustrates schematically return loss of the beam steering antenna of FIG. 6.
Figure 9:
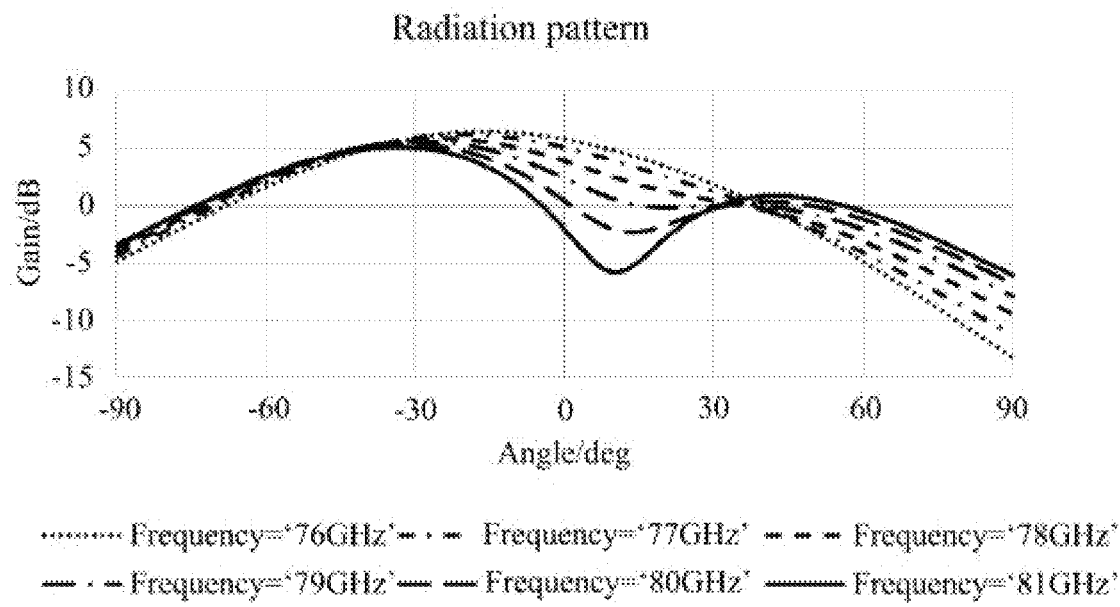
FIG. 9 is a radiation pattern of the beam steering antenna of FIG. 6.
Figure 10:
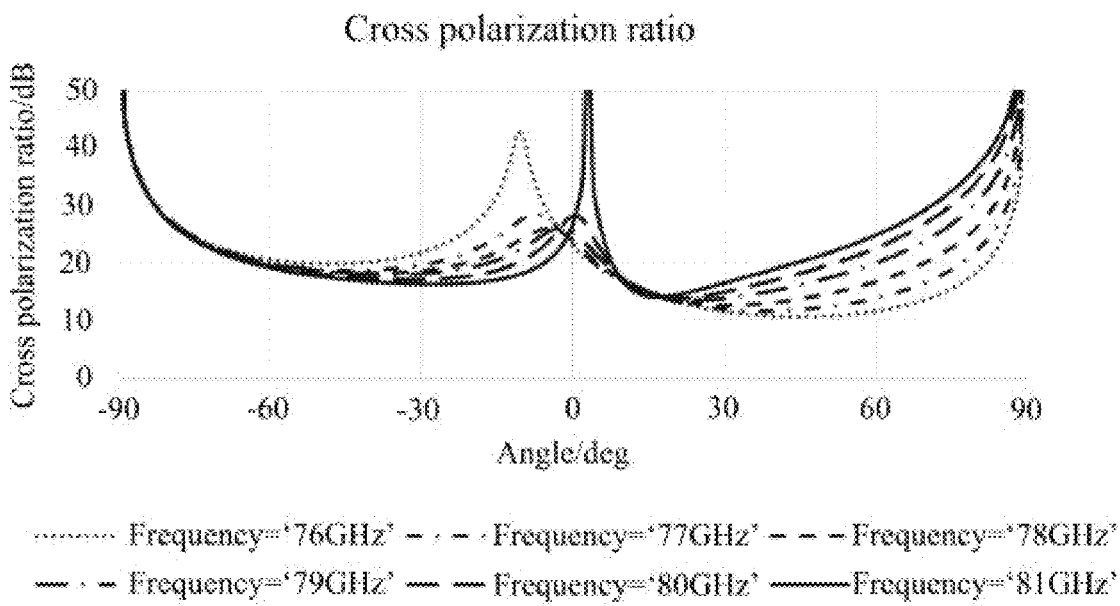
FIG. 10 is a schematic diagram of cross polarization ratio-radiation direction of the beam steering antenna of FIG. 6.

FIG. 8 is a schematic diagram of return loss corresponding to the beam steering antenna provided in FIG. 6, FIG. 9 is a radiation pattern corresponding to the beam steering antenna provided in FIG. 6, and FIG. 10 is a schematic diagram of cross polarization ratio-radiation direction corresponding to the beam steering antenna provided in FIG. 6. As shown in FIG. 8, when the operating frequency band of the beam steering antenna is 76-79 GHz, its corresponding return loss is the lowest. As shown in FIG. 9, within a millimeter wave frequency band within a range of 76-81 GHz, beam steering antennas have all achieved different degrees of beam steering, and main beam gains are greater than 5 dB. As shown in FIG. 10, also within the millimeter wave frequency band within the range of 76-81 GHz, cross polarization ratios of beam steering antennas are all greater than 10 dB. The far-field pattern of the antenna in the TM20 mode is null steering in the middle and convex at two sides in the xoz plane; because currents are inverted, the beam steering antenna shown in FIG. 6B operates in the TM11 mode, and the far-field pattern of the TM11 mode is also null steering in the middle and convex at two sides in the xoz plane, but the polarization direction of TM20 mode is an X direction, while the polarization direction of the TM11 mode is the Y direction.

The radiation angle range of the beam steering antenna shown in FIG. 4 or FIG. 6 may be applicable to, e.g., the measurement sensor of the vehicle. Taking a sensor of the vehicle for measuring an angle as an example, it is assembled at a corner (also called a body corner) position of a vehicle body, and a central axis of the radiation angle range is approximately 45° with a side direction of the vehicle. Therefore, the measurement sensor equipped with the antenna may probe measurement information in both directions of a body side of the vehicle and a front (or a rear) of the vehicle. In particular, the beam steering antenna can measure a farther distance of the front (or the rear) of the vehicle, so as to effectively output measurement information for preventing rear-ending, a blind spot and the like during driving an automobile.

Figure 11:
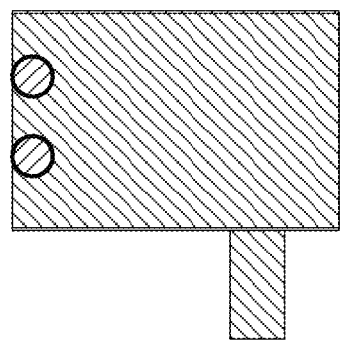
FIG. 11 illustrates schematically another beam steering antenna structure.

FIG. 11 is another schematic diagram of a structure of a beam steering antenna according to an embodiment of the present disclosure. As shown in FIG. 11, in order to further reduce the size of the radiation structure, so that an extended area occupied by the radiation structure of the beam steering antenna is reduced as a whole, the length of the long side edge of the first radiation patch may be reduced, for example, determining that the length of the long side edge is about ½ W. At this time, a plurality of metal via holes are disposed in the first radiation patch away from one side at which the feeding portion is disposed, wherein a metal via hole is electrically connected to the first radiation patch and the ground plane layer. The metal via hole as a metal perturbation component may cause the current distribution of the first radiation region to be different from that of the second radiation region, and the metal via hole may be disposed in the first radiation region or the second radiation region. For example, the metal via hole may be disposed on a non-radiation edge of the first radiation region or the second radiation region to vary the current distribution within the respective region. The metal via hole is connected to a metal ground (also called the ground plane layer) of the antenna across layers.

Exemplarily, a hole wall of the metal via hole may be coated with a metal layer to be connected with the metal ground plane layer, and a plurality of metal via holes may be disposed in the first radiation patch to form a row of metal via holes relative to an edge of the short side edge on which the feeding portion is disposed, wherein a pitch between adjacent metal via holes is less than $\lambda_g/4$.

Figure 12:
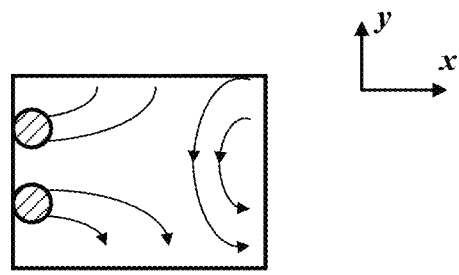
FIG. 12 is a diagram for a current distribution of the beam steering antenna of FIG. 11.

FIG. 12 is a diagram of a current distribution of the beam steering antenna structure shown in FIG. 11. The first radiation patch having the long side edge with the length of about ½ W and disposed with the row of metal via holes may achieve a current distribution as shown in FIG. 12.

The row of metal via holes may form an electrical wall structure, such as a row of metal via holes disposed along the non-radiation edge of the first radiation region, each metal via hole in the row of metal via holes being connected across layers to the metal ground of the antenna. A pitch between metal via holes in the row of metal via holes is less than $\lambda_g/4$. As the electrical wall structure is disposed, standing waves may be generated at a radiation edge of the first radiation region, so that a current density distributed per unit area may be increased. Also, as the electrical wall structure is disposed, a length of a current path of the first radiation region in the beam steering antenna shown in FIG. 11 is shorter than that in the beam steering antenna shown in FIG. 4 and a current density of the first radiation region in FIG. 11 is larger under a same output power. Therefore, the beam steering antenna may still form two main radiation directions with asymmetric radiation gains as shown in FIG. 12 within the radiation angle range.

Figure 13:
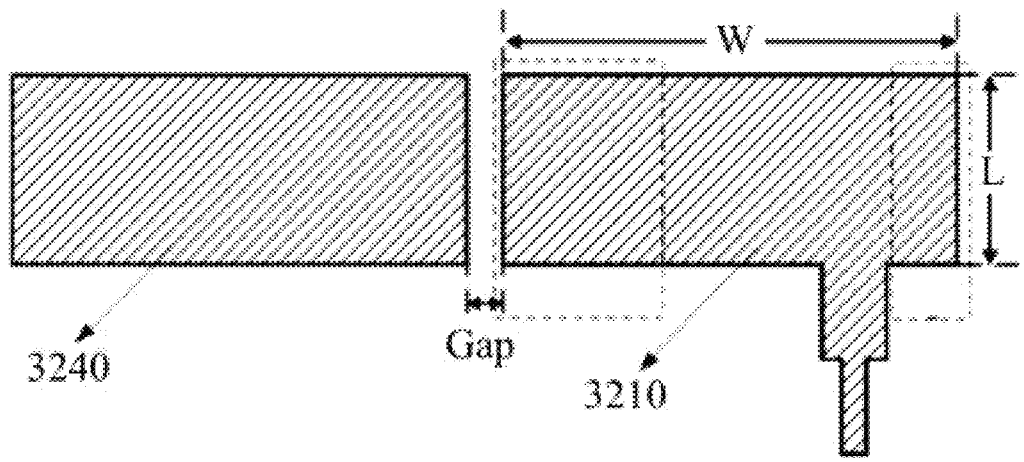
FIG. 13 illustrates schematically a structure of another beam steering antenna.
Figure 14:
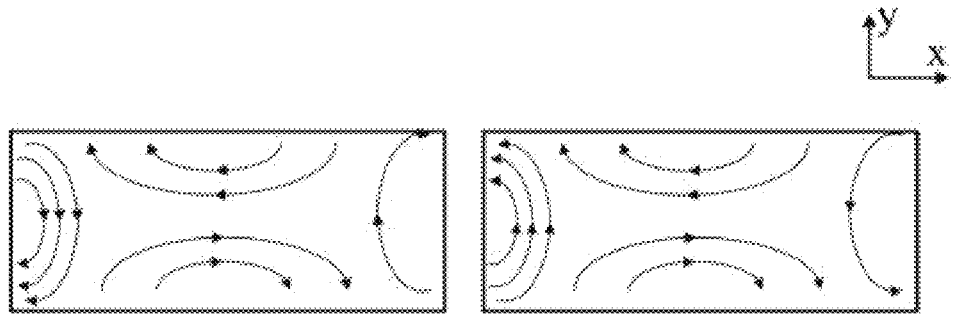
FIG. 14 illustrates schematically current distributions of the beam steering antenna of FIG. 13.

FIG. 13 is a schematic diagram of a structure of another beam steering antenna according to an embodiment of the present disclosure, and FIG. 14 is a diagram of current distributions of a structure of a beam steering antenna provided in FIG. 13. As shown in FIG. 13, in an embodiment, the beam steering antenna further includes a second radiation patch 3240, wherein the second radiation patch 3240 is disposed at one side of the short side edge of the first radiation patch 3210 and spaced from the short side edge by a preset distance, and the short side edge adjacent to the second radiation patch 3240 is the short side edge away from the feeding portion 3220.

The second radiation patch 3240 may be understood as an extension of the aforementioned radiation structure and thus may be called an extended radiation structure. The second radiation patch 3240 may be located in the metal layer in which the first radiation patch 3210 is located. The second radiation patch 3240 may be coupled to the first radiation region or the second radiation region and configured to increase a gain of a generated probing signal wave within a preset radiation angle range. The second radiation patch 3240 may be disposed at one side of a region in which a radiation electromagnetic wave energy is relatively large in the radiation structure. An antenna gain in a symmetrical central radiation direction within the preset radiation angle range may be improved through the second radiation patch 3240, so that a receive antenna receives the echo signal wave more sensitively within the radiation angle range.

A size of the second radiation patch 3240 is configured to be able to be excited to a high-order mode when fed by the first radiation patch 3210, or a size of the second radiation patch 3240 is configured to be able to be excited to a fundamental mode when fed by the first radiation patch 3210. There is a gap between the first radiation patch 3210 and the second radiation patch 3240, so that the first radiation patch 3210 and the second radiation patch 3240 are fed and connected in an inductive coupling mode. Excited by an induced electrical field of the first radiation patch 3210 and the second radiation patch 3240, as shown in FIG. 14, the first radiation patch and the second radiation patch have the same current distribution. Because of increases of an aperture and a quantity of equivalent radiation sources, not only a gain of the beam steering antenna in a radiation main direction is enhanced and a region with an insufficient gain within the radiation angle range is compensated, but also a role of increasing a beam steering angle is played. A radiation change of electromagnetic waves caused by the above current distribution may be represented by a radiation power of electromagnetic wave generated in each region, and technicians may calculate it by using a conversion relationship between an electromagnetic wave and a changed current, which will not be described in detail here.

Figure 15:
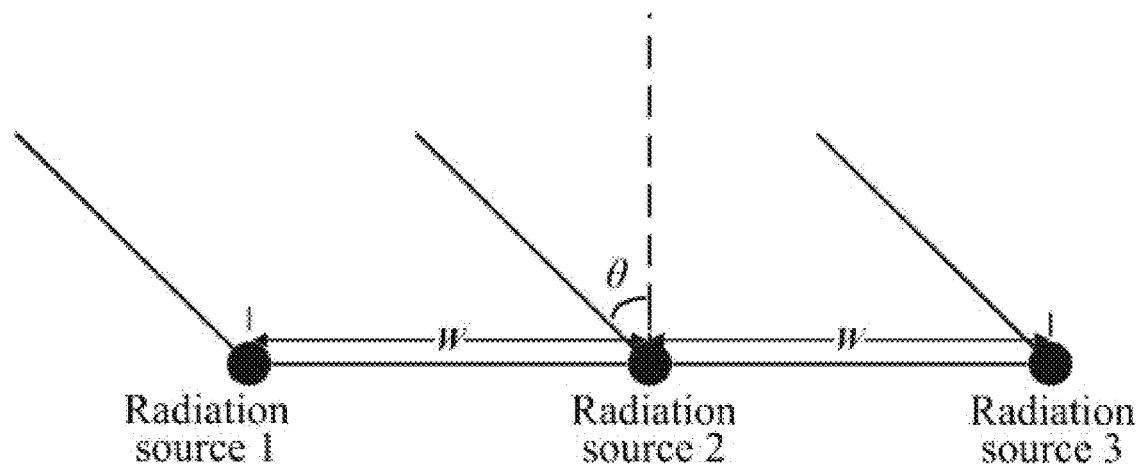
FIG. 15 illustrates schematically an equivalent radiation source of the beam steering antenna of FIG. 13.
Figure 16:
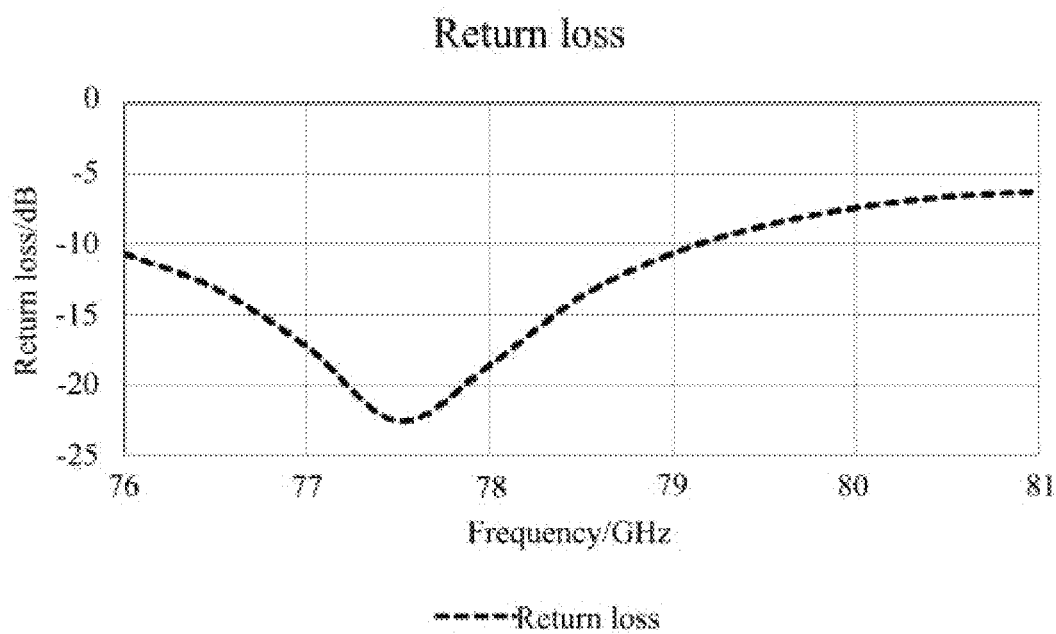
FIG. 16 illustrates schematically return loss of the beam steering antenna of FIG. 13.
Figure 17:
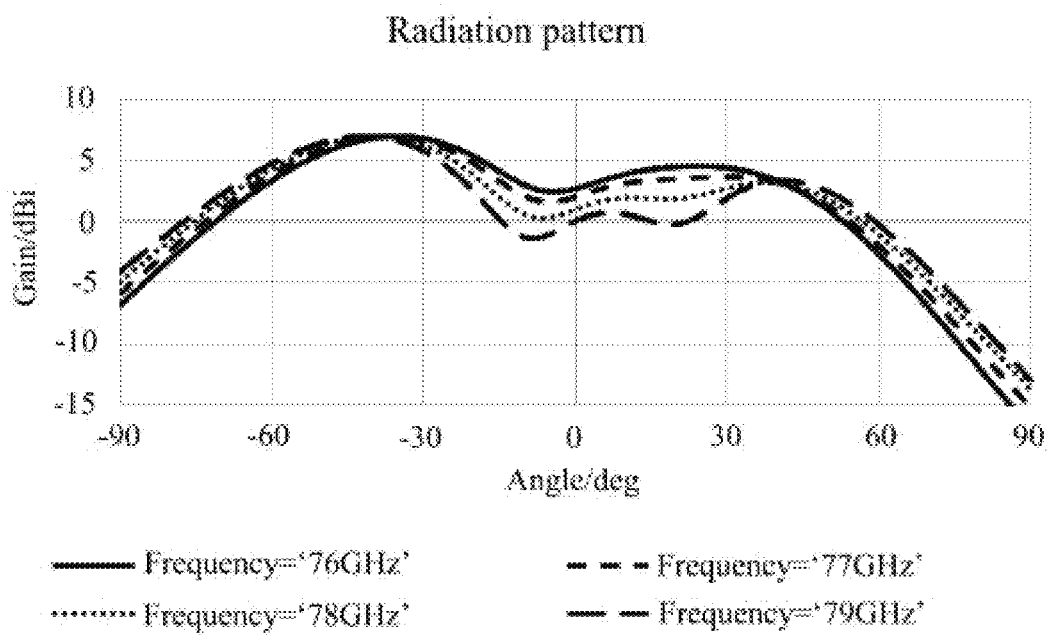
FIG. 17 is a radiation pattern of the beam steering antenna of FIG. 13.

FIG. 15 is a schematic diagram of an equivalent radiation source of the beam steering antenna provided in FIG. 13, FIG. 16 is a schematic diagram of return loss of the beam steering antenna provided in FIG. 13, and FIG. 17 is a radiation pattern of the beam steering antenna provided in FIG. 13. Because a main radiation source is a current in the y direction, a surface current distribution of FIG. 14 may therefore be equivalent to three radiation sources shown in FIG. 15. By testing the current direction, a direction of a second source (the first radiation region and its induced region in the second radiation patch) is opposite to a direction of the first source and the third source (a region in which the non-radiation edge of the second radiation patch away from the first radiation patch is located). Therefore, initial phases pha_n corresponding to the three sources are pha_1=0°, pha_2=180°, and pha_3=0°, respectively. If W=2.4 mm, D_n is a distance from the nth source to the first source, D_1=0, D_2=W, D_3=2 W, and an operating frequency band is in a millimeter wave band, such as 78 GHz, then $(pha\_n+D\_n/\lambda, \sin \theta \cdot 2\pi)|\_(n=1)=(pha\_n+D\_n/\lambda \sin \theta \cdot 2\pi)|\_(n=2)=(pha\_n+D\_n/\lambda \sin \theta \cdot 2\pi)|\_(n=3)$. At this time, an angle $\theta=(-53°\pm\Delta)$ corresponding to a maximum gain $E(\theta)$ may be obtained, wherein $\Delta$ is an angle error, which is affected by a semiconductor process error, a measurement accuracy, or the like. It can be seen that the antenna not only broadens the radiation angle range, but also is more conducive to acquiring the echo signal wave more sensitively within the radiation angle range.

In an exemplary embodiment, the radiation structure may correspondingly be configured with a plurality of feeding structures in order to achieve adaptation requirements of the antenna for antenna reconstruction in measurement sensors (e.g. radars) of different design requirements, wherein a feeding position of each feeding structure connected with the radiation structure is related to a radiation angle range and/or a radiation gain of a measurement sensor.

Figure 18:
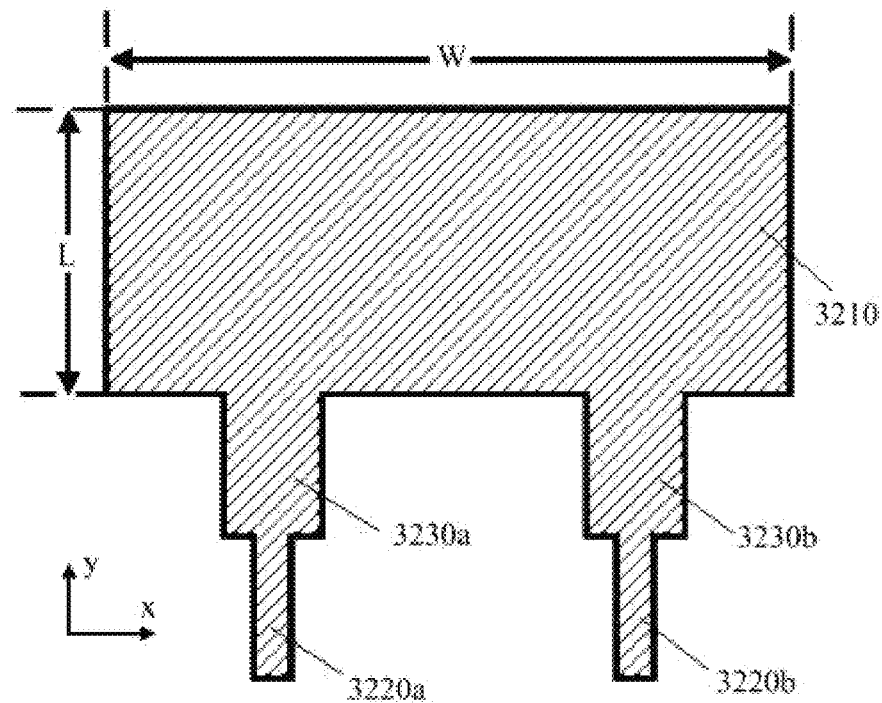
FIG. 18 illustrates schematically a structure of another microstrip antenna.

FIG. 18 is a schematic diagram of a structure of another microstrip antenna according to an embodiment of the present disclosure. Different from the aforementioned embodiment, in the present embodiment, the antenna according to the present embodiment is fed bilaterally, while the aforementioned embodiments of FIG. 4, FIG. 6, FIG. 11, FIG. 13, and the like are all fed unilaterally. The antenna structure of the present embodiment may provide a function of beam reconstruction. The radiation structure is connected with the first feeding portion and the second feeding portion respectively at two feeding positions symmetrical on a first long side edge. By adjusting a connection mode of each feeding structure of the antenna to the signal transceiver and/or adjusting a current phase, a radiation direction of the electromagnetic wave provided by the antenna may be changed.

As shown in FIG. 18, the microstrip antenna includes: a dielectric layer 310, a ground plane layer 330, and a feeding layer 320; wherein, one side of the dielectric layer 310 is disposed with a ground plane layer 330, and the other side of the dielectric layer 310 is disposed with a feeding layer 320; the feeding layer 320 includes a first radiation patch (or called a radiator) 3210, a first feeding portion 3220a, and a second feeding portion 3220b; the first feeding portion 3220a is located at one side of a symmetrical center of an edge (the aforementioned long side edge) of the first radiation patch 3210 along the first direction x, and the second feeding portion 3220b is located at the other side of the symmetrical center of the edge (the same long side edge) of the first radiation patch 3210 along the first direction x, so that the radiator can generate high-order sub-modal radiation under excitation of the first feeding portion or the second feeding portion; the first feeding portion 3220a and/or the second feeding portion 3220b are configured to transmit signals to the first radiation patch 3210, and the first feeding portion 3220a and/or the second feeding portion 3220b may be configured to transmit spatial radiation signals received by the first radiation patch 3210.

the ground plane layer 330 is located on another face of the dielectric layer 310, which is not shown in FIG. 18. The feeding layer 320 may be configured to generate electromagnetic waves and receive spatial radiation signals, the first feeding portion 3220a and the second feeding portion 3220b are signal transmission devices, capable of transmitting a signal to the first radiation patch 3210, and the first radiation patch 3210 may generate electromagnetic waves by using the signal. A first direction of the first radiation patch 3210 is a long edge direction of the first radiation patch 3210, and a radiator may be a rectangular radiator or of a shape with a rectangular envelope profile. For example, a gap is disposed on the radiator to achieve impedance matching, etc.

Taking the radiator being rectangular as an example, the first radiation patch 3210 includes two long edges and two short edges, and the first feeding portion 3220a and the second feeding portion 3220b are respectively located at two sides of the symmetrical center of the long edge of the first radiation patch 3210.

Further, the first feeding portion 3220a and/or the second feeding portion 3220b are configured to transmit a radio frequency transmit signal to the first radiation patch 3210; or the first feeding portion 3220a and/or the second feeding portion 3220b are configured to output a radio frequency receive signal received by the first radiation patch 3210.

The first radiation patch 3210 includes a first edge along a first direction of the first radiation patch 3210, and a second edge intersecting the first edge along a second direction of the first radiation patch 3210; wherein a length of the first edge is about twice a length of the second edge.

The first edge may be understood as the long edge of the first radiation patch 3210, the second edge may be understood as the short edge of the first radiation patch 3210, and the second direction is a short edge direction of the first radiation patch 3210.

In an exemplary embodiment, a length relationship between the first edge and the second edge of the first radiation patch 3210 is related to the wavelength $\lambda g$ of the guided wave in the medium. For example, the length relationship between the first edge and the second edge is related to a frequency band of electromagnetic waves radiated and/or received by the radio device on which the antenna is located. Exemplarily, the length of the first edge may be twice the length of the second edge, and a microstrip short branch connected between the first edge and the second edge may be used for achieving impedance matching of 50 ohms.

As can be seen from FIG. 18, the feeding layer 320 may further include: a first matching structure 3230a, connected between the first feeding portion 3220a and the first radiation patch 3210, and configured to perform impedance matching between the first feeding portion 3220a and the first radiation patch 3210; and a second matching structure 3230b, connected between the second feeding portion 3220b and the first radiation patch 3210, and configured to perform impedance matching between the second feeding portion 3220b and the first radiation patch 3210.

Impedance matching refers to a suitable match is reached between a signal source or a transmission line and a load, which may be reflected in such aspects as an Isolation of the antenna, a standing wave index, or return loss performance. Impedance matching is not only related to the propagation medium of electromagnetic wave, but also related to impedance matching of the feeding portion and the radiator. For this reason, an impedance of the radiator of the antenna may be set according to an impedance of the propagation medium, and a resistor may be disposed in the antenna so that an equivalent impedance of the feeding portion is adapted to an equivalent impedance of the radiator.

The impedance when performing impedance matching may be determined according to an equivalent impedance of the first radiation patch 3210. Further, the first matching structure 3230a is configured to perform impedance matching between the first feeding portion 3220a and the first radiation patch 3210, and the second matching structure 3230b is configured to perform impedance matching between the second feeding portion 3220b and the first radiation patch 3210.

The first feeding portion 3220a and the first radiation patch 3210 may be directly connected to feed or coupled to feed; likewise, the second feeding portion 3220b and the first radiation patch 3210 may be directly connected to feed or coupled to feed.

Directly connecting to feed includes directly connecting the first feeding portion 3220a to the first radiation patch 3210 for feeding through a device such as a connecting line, a connecting element, or the like, or directly connecting the second feeding portion 3220b to the first radiation patch 3210 for feeding. Being coupled to feed includes inductive coupling feeding, feeding to the radiation portion by using a resonant cavity or electrical field induction mode.

Exemplarily, the first feeding portion 3220a and/or the second feeding portion 3220b is a microstrip structure arranged along an envelope profile of the radiator, and the microstrip structure (also called a concave portion) is in a concave shape bent from an offset feed position of a first edge of the radiator to a second edge. In other words, the second edge of the first radiation patch 3210 is disposed in a region disposed by concave portions of the first feeding portion 3220a and the second feeding portion 3220b, so that the first feeding portion 3220a and/or the second feeding portion 3220b achieve offset feed by inductive feeding.

The microstrip antennas according to the embodiment of the present disclosure may be integrated on a packaging body of the chip or integrated on a same PCB board as the chip. The chip is a semiconductor element including the signal transmitter and/or the signal receiver.

For the technical solution of the present embodiment, one side of the dielectric layer is disposed with a ground plane layer, and the other side of the dielectric layer is disposed with the feeding layer; the feeding layer includes a first radiation patch, a first feeding portion, and a second feeding portion; the first feeding portion is located at one side of a symmetry center of an edge of the first radiation patch along a first direction, and the second feeding portion is located at the other side of the symmetry center of the edge of the first radiation patch along the first direction; the first feeding portion and the second feeding portion are configured to transmit a signal to the first radiation patch, and the first feeding portion and the second feeding portion are further configured to transmit a spatial radiation signal received by the first radiation patch. For the technical solution of the embodiment of the present disclosure, the first feeding portion and the second feeding portion transmit signals which are not completely the same to the radiator, which can achieve reconstruction of a beam, and improve a coverage range of an antenna. It effectively avoids problems caused by using multiple-string antennas for beamforming, for example, increasing design complexity and cost of a system, needing to introduce a power splitter to achieve a series connection of antennas, resulting in additional losses, and so on.

Figure 21:
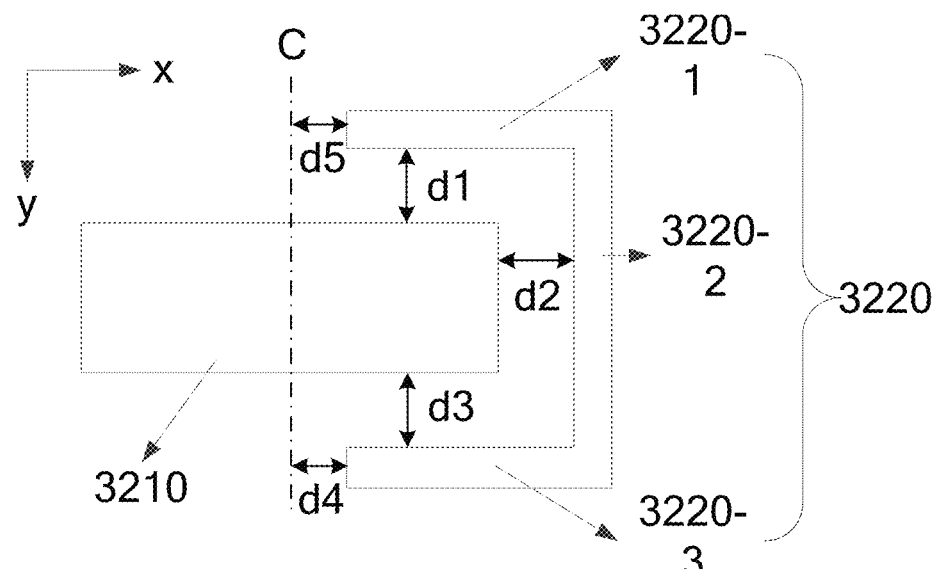
FIG. 21 illustrates schematically a structure of another beam steering antenna.

FIG. 21 is a schematic diagram of a structure of another beam steering antenna according to an embodiment of the present disclosure. As shown in FIG. 21, exemplarily, a portion between the center position of the long side edge and the short side edge in the first radiation patch 3210 is recessed in a groove formed by the feeding portion 3220, so that the feeding portion 3220 and the first radiation patch 3210 are coupled to feed. As shown in FIG. 21, the feeding portion 3220 is of a "C" character shape, and includes a first sub-feeding portion 3220-1, a second sub-feeding portion 3220-2, and a third sub-feeding portion 3220-3 connected in sequence, wherein a first end of the first sub-feeding portion 3220-1 is close to a symmetry axis C of the first radiation patch 3210, a second end of the first sub-feeding portion 3220-1 is connected with a first end of the second sub-feeding portion 3220-2, and the second sub-feeding portion 3220-2 extends along the second direction y. A second end of the second sub-feeding portion 3220-2 is connected with a first end of the third sub-feeding portion 3220-3, the third sub-feeding portion 3220-3 extends along an opposite direction of the first direction x, and a second end of the third sub-feeding portion 3220-3 is close to the symmetry axis C of the first radiation patch 3210, the first direction x and the second direction y being perpendicular to each other. As shown in the figure, the first sub-feeding portion 3220-1 and the third sub-feeding portion 3220-3 are parallel to a long side edge extending direction, and the second sub-feeding portion 3220-2 is parallel to a short side edge extending direction.

The first radiation patch 3210 is spaced from the feeding portion 3220 by a first preset distance, as shown in FIG. 21, a distance between the first sub-feeding portion 3220-1 and the first radiation patch 3210 is d1, a distance between the second sub-feeding portion 3220-2 and the first radiation patch 3210 is d2, and a distance between the third sub-feeding portion 3220-3 and the first radiation patch 3210 is d3, wherein the d1, d2, and d3 may be the same or different (including any two different or all three different), and d1, d2 and d3 together form a gap on a metal layer. Based on a current open circuit formed by the gap, the beam steering antenna may generate electromagnetism when a high frequency current is fed into the metal layer, so as to achieve coupling feeding between the feeding portion 3220 and the first radiation patch 3210. An area of the first radiation patch 3210 recessed in the groove formed by the feeding portion 3220 is less than half of an area of the first radiation patch 3210. A distance between the first end of the first sub-feeding portion 3220-1 and the symmetry axis C is d5, and a distance between the second end of the third sub-feeding portion 3220-3 and the symmetry axis C is d4, wherein d4 and d5 may be the same or different. As shown in FIG. 21, in this example, an offset feed distance between the feeding portion and the center position of the first radiation patch may be considered as d4 in the figure, wherein d4 is greater than 0, that is, the third sub-feeding portion 3220-3 does not exceed the symmetry axis of the first radiation patch 3210. All three portions of the feeding portion 3220 participate in the coupling feeding of the first radiation patch 3210, and a coupling capability thereof is related to values of d1 to d3 and also related to a projection area. For example, the longer a length of the third sub-feeding portion 3220-3, the longer a coincidence length projected onto the first radiation patch 3210, and the greater the coupling capability. Of course, a position, a shape, and a direction of the gap may affect a radiation mode of electromagnetic waves generated by the beam steering antenna. For example, a radiation direction and/or a radiation power may be affected.

Likewise, the configuration may form a current distribution as shown in FIG. 7, and correspondingly the first radiation region and the second radiation region are determined according to different directions and/or different current densities of induced currents.

Figure 22:
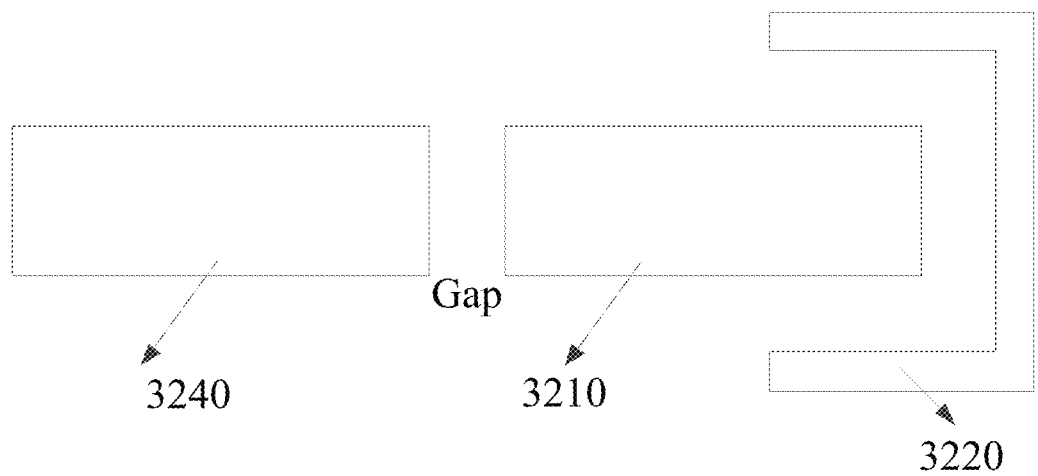
FIG. 22 illustrates schematically a structure of another beam steering antenna.

FIG. 22 is a schematic diagram of a structure of another beam steering antenna according to an embodiment of the present disclosure. As shown in FIG. 22, the beam steering antenna further includes a second radiation patch 3240 on the basis of the illustration in FIG. 21.

In an exemplary embodiment, sizes of the second radiation patch 3240 and the first radiation patch 3210 may be identical, the second radiation patch 3240 is disposed at one side of the short side edge of the first radiation patch 3210 and spaced from the short side edge by a preset distance, and a short side edge adjacent to the second radiation patch 3240 is a short side edge away from the feeding portion 3220. There is a gap between the first radiation patch 3210 and the second radiation patch 3240, so that the first radiation patch 3210 and the second radiation patch 3240 are fed and connected in an inductive coupling mode. Under excitation of induced electrical fields of the first radiation patch 3210 and the second radiation patch 3240, a current distribution as shown in FIG. 14 is formed.

An embodiment of the present disclosure provides a beam steering antenna, which includes: a dielectric layer, and a metal layer and a ground plane layer disposed at two sides of the dielectric layer, wherein the metal layer includes a first radiation patch and a feeding portion; a length of a long side edge of the first radiation patch is determined based on an operating wavelength of the beam steering antenna, and a length of a short side edge of the first radiation patch is smaller than a length of the long side edge; the feeding portion is coupled between a center position of the long side edge and a short side edge of the first radiation patch, and the feeding portion is configured to transmit a high frequency signal (also called a radio frequency signal) to the first radiation patch, or to transmit a space radiation signal received by the first radiation patch. For the above technical solution, a feeding portion coupled between a center position of a long side edge and a short side edge of a first radiation patch and the first radiation patch perform connection feeding or coupling feeding, which achieves offset feed of the first radiation patch, and a current distribution on the first radiation patch achieves conversion of electromagnetic waves with a plurality of radiation main directions. In addition, a pitch between a plurality of radiation sources corresponding to the antenna structure of the present disclosure is shorter than a pitch between a plurality of radiation sources corresponding to the radiation structure shown in FIG. 2, so the embodiment of the present disclosure achieves beam steering in a case of effectively reducing a size of an antenna.

In conjunction with the schematic diagrams provided in FIGS. 8 and 16, high-order antennas adopted in the present disclosure are more applicable for antennas with relatively wide beam widths. A beam width (also called a beam angle) is used for representing an angle between two points at which a power flux density in a maximum radiation direction of an antenna in a certain plane falls to half. An index representing the two points at which the power flux density falls to half is exemplified as points corresponding to a 3 dB drop in a radiation power in a corresponding plane of the maximum radiation direction of the antenna. The plane is, for example, a horizontal plane or a vertical plane. The beam width may be related to an antenna gain, for example, the larger the antenna gain, the narrower the beam.

The antenna gain is expressed by a ratio of power densities of signals generated by an actual antenna and an ideal antenna at a same point in space under a condition of an equal input power. The antenna gain is used for measuring an ability of an antenna to send and receive signals toward one specific direction.

In order to make the preset radiation angle range and its antenna gain meet engineering requirements such as automotive safety for corner radars, the antenna according to the present disclosure may be an antenna array including a plurality of beam steering antennas. A plurality of beam steering antenna units are connected by respective feeding structures.

Antenna arrays (or array antennas) will be described in detail below in conjunction with the accompanying drawings.

An embodiment of the present disclosure provides an antenna array, which may include: a plurality of microstrip line antennas, wherein adjacent microstrip line antennas are connected by a feeding portion. For example, a plurality of beam steering antennas are included, and adjacent beam steering antennas are connected by a feeding portion. Exemplarily, the plurality of microstrip antennas may be cascaded in series, parallel, or a hybrid of series and parallel, etc.

Figure 23A:
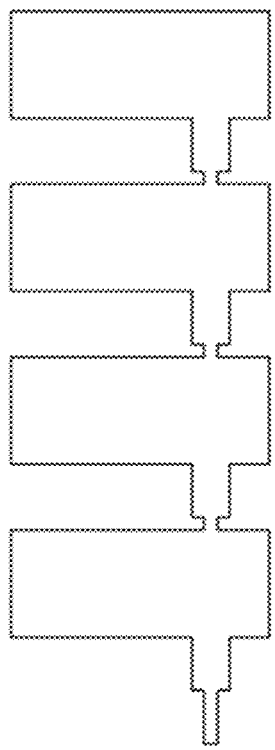
FIGS. 23A to 23B illustrates schematically two antenna arrays.
Figure 23B:
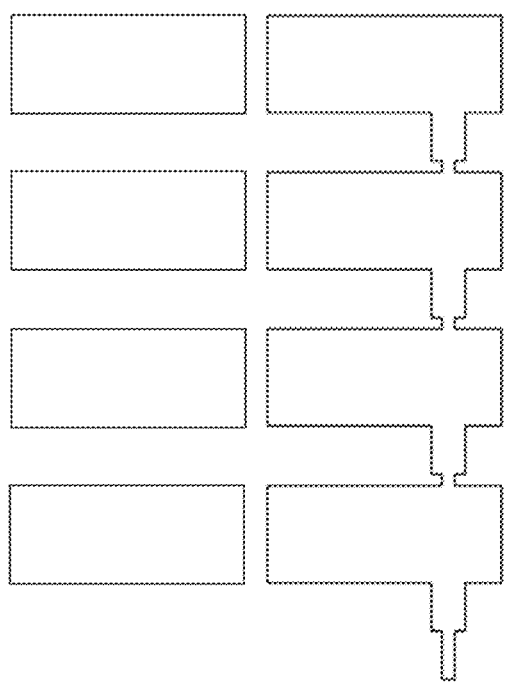

FIGS. 23A to 23B are schematic diagrams of two antenna arrays according to an embodiment of the present disclosure. As shown in FIG. 23A, a feeding portion of a beam steering antenna is connected to and feeds a first radiation patch, and the feeding portion of the beam steering antenna is connected to a first radiation patch of another beam steering antenna. As shown in FIG. 23B, on the basis of FIG. 23A, a first radiation patch of each beam steering antenna corresponds to a second radiation patch. A position and an effect of the second radiation patch are referenced to the description in the previous text and will not be repeated here.

Figure 24A:
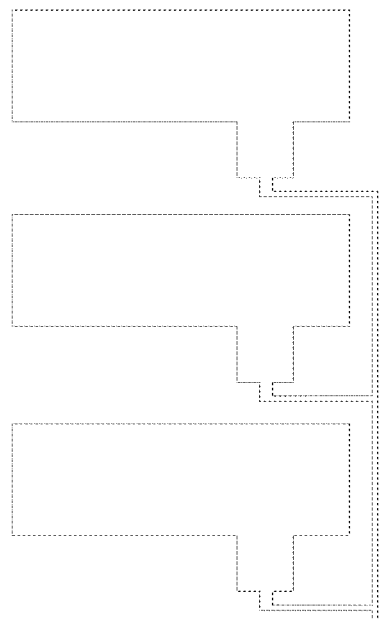
FIGS. 24A to 24B illustrates schematically two other antenna arrays.
Figure 24B:
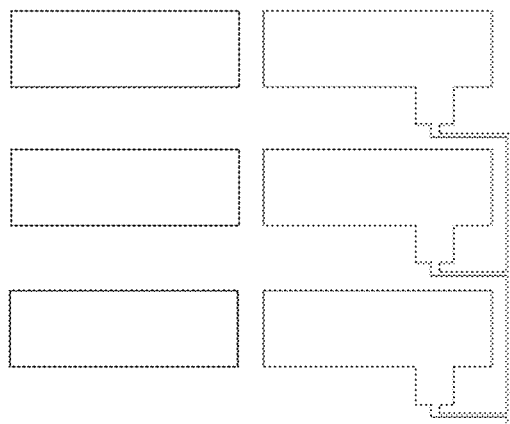

FIGS. 24A to 24B are schematic diagrams of two other antenna arrays according to an embodiment of the present disclosure, as shown in FIG. 24A, including a plurality of beam steering antennas as shown in FIG. 6, wherein a feeding portion of each beam steering antenna is connected to and feeds a first radiation patch, and feeding portions of the plurality of beam steering antennas are respectively connected to a transmission line. As shown in FIG. 24B, a plurality of beam steering antennas as shown in FIG. 13 are included, i.e. on the basis of FIG. 24A, a first radiation patch of each beam steering antenna corresponds to a second radiation patch. A position and an effect of the second radiation patch are referenced to the description in the previous text and will not be repeated here.

Figure 25:
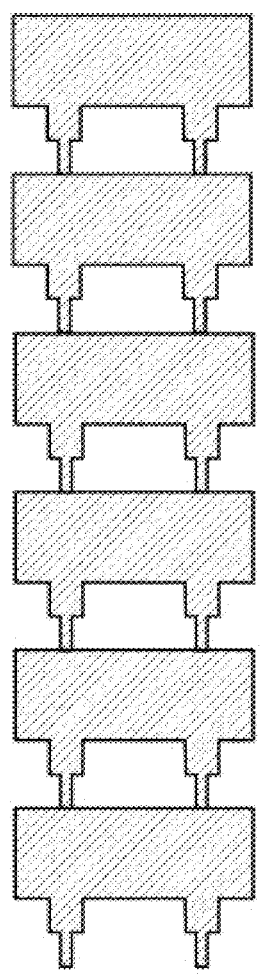
FIG. 25 illustrates schematically a structure of another antenna array.

FIG. 25 is a schematic diagram of another antenna array according to an embodiment of the present disclosure, as shown in FIG. 25, including a plurality of microstrip line antennas as shown in FIG. 18, wherein a plurality of microstrip antennas are cascaded according to their respective feeding portions. As shown in FIG. 25, first feeding portions and second feeding portions of the plurality of microstrip antennas are all connected by first radiation patches of microstrip antennas at adjacent positions.

In some examples, not shown in the figure, the plurality of microstrip antennas may be cascaded according to their respective feeding portions, which may be, for example, the first feeding portions of the plurality of microstrip antennas are directly connected and the second feeding portions of the plurality of microstrip antennas are directly connected. For example, the first feeding portions of the plurality of microstrip antennas are electrically connected by a device such as a connection line, a connection element, or the like, and the second feeding portions of the plurality of microstrip antennas are electrically connected by a device such as a connection line, a connection element, or the like.

In some other examples, the plurality of microstrip antennas may be cascaded according to their respective feeding portions in such a mode that the first feeding portions of the plurality of microstrip antennas are inductively coupled through a first transmission line and the second feeding portions are inductively coupled through a second transmission line; wherein the first transmission line is disposed at one side of a first feeding portion away from a symmetry center of a first edge of a radiator, and the second transmission line is disposed at one side of a second feeding portion away from the symmetry center of the first edge of the radiator.

Figure 26:
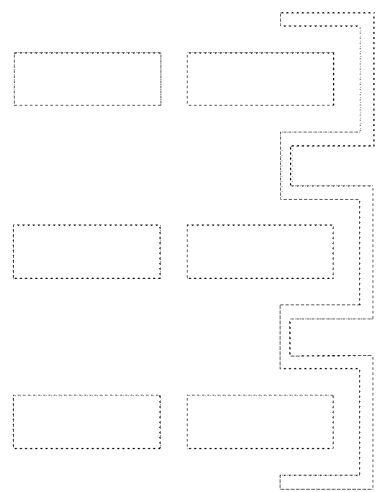
FIG. 26 illustrates schematically another antenna array.

FIG. 26 is a schematic diagram of another antenna array according to an embodiment of the present disclosure. As shown in FIG. 26, a feeding portion of a beam steering antenna and a first radiation patch are coupled for feeding, and the feeding portions of all the beam steering antennas are connected in series.

Figure 27:
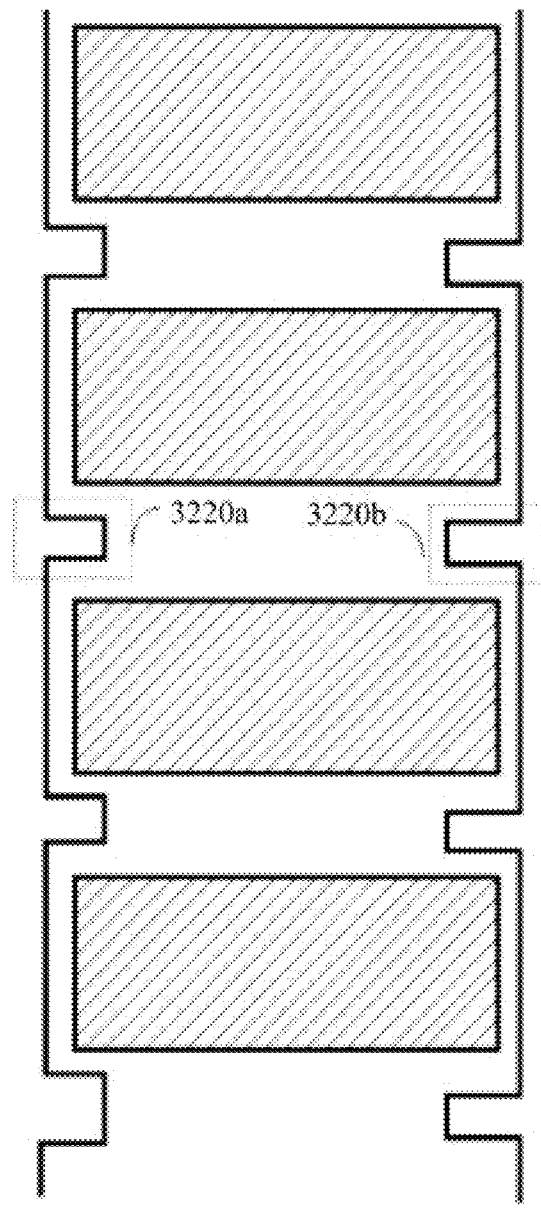
FIG. 27 illustrates schematically another antenna array.

FIG. 27 is a schematic diagram of a structure of another antenna array according to an embodiment of the present disclosure, wherein 3220*a* is a first feeding portion of a microstrip antenna, 3220*b* is a second feeding portion of the microstrip antenna, and thick black lines are transmission lines. A transmission line located next to the first feeding portion 3220*a* is a first transmission line and a transmission line located next to the second feeding portion 3220*b* is a second transmission line. Exemplarily, a feeding portion may collect electromagnetic induction brought by the transmission line to excite a surface of the radiator to produce changed electrical signals.

The connection mode of the first feeding portion and/or the second feeding portion of the microstrip antenna in the above example may have other modes, for example, a plurality of first feeding portions of a plurality of microstrip antennas are connected to other metal layers through metal via holes and connected through a feeding network, or the like. For another example, the first feeding portion and the second feeding portion do not necessarily adopt the same connection mode. According to an arrangement design between a plurality of antenna arrays of a radar sensor, the connection modes of the first feeding portion and the second feeding portion may be different, for example, a plurality of first feeding portions in the antenna arrays are connected through transmission lines, and a plurality of second feeding portions are connected through adjacent radiators.

In an exemplary embodiment, a plurality of layers forming the antenna array may be formed by a PCB circuit board. For example, the antenna array according to the embodiment of the present disclosure may be disposed on a PCB board and connected with a chip through a transmission line on the PCB board to achieve integration of the antenna and the chip. The chip may be a semiconductor element including a signal transmitter and/or a signal receiver, such as a radar chip.

The antenna array of the present embodiment includes a plurality of microstrip antennas described in any embodiment of the present disclosure, wherein the plurality of microstrip antennas are cascaded through their respective feeding portions. A coverage range of the antenna can be improved. It effectively avoids problems caused by using multiple-string antennas for beamforming, for example, increasing design complexity and cost of a system, needing to introduce a power splitter to achieve a series connection of antennas, resulting in additional losses, and so on.

A current phase corresponding to a feeding position of the feeding portion of each microstrip antenna is basically the same, and a plurality of beam steering antennas may radiate electromagnetic waves with different gains in two radiation directions within the radiation angle range. In the antenna array, a size of each beam steering antenna or a distance between a feed line and a radiation patch (an energy that affects the coupling portion on the patch) or a distance between the first radiation patch and the second radiation patch may not be completely consistent with other beam steering antennas, so as to effectively suppress a sidelobe gain of the antenna while satisfying a beam width. For example, the distance between the first radiation patch and the second radiation patch of the radiation structure at head and tail edges of the antenna is shorter than the distance of the radiation structure at the middle.

Of course, the beam steering antenna included in the antenna array may be used as a transmit antenna or a receive antenna. In order to adapt a plurality of channels of probing signal waves transmitted by the antenna array and an energy requirement for receiving a plurality of channels of echo signal waves, the antenna array further includes: a power splitter coupled with at least one channel of beam steering antenna, wherein the power splitter is configured to distribute a radiation power of the beam steering antenna.

In order to prevent a signal interference between receiving and transmitting antennas in the antenna array, and reduce a size of the beam steering antenna at the same time, the antenna array configures a pitch between adjacent beam steering antennas and a pitch between feeding structures according to an Isolation. Or any of the above pitches is shortened by configuring an isolation portion in the antenna array, which includes, for example, at least one of the following: isolation between the receiving and transmitting antennas, and isolation of feeding. The isolation between the receiving and transmitting antennas may be represented by a ratio of a power of a signal transmitted by one antenna to a power of a signal received by another antenna. The higher the Isolation of the antenna is, the lower an interference degree between transmitting signals and receiving signals is. With an increase of a device Integration of an integrated circuit or a further reduction of a size of the antenna, a coupling problem between transmitting signals and receiving signals becomes more and more prominent in the antenna array including the transmit antenna and the receive antenna.

For an antenna array including a plurality of channels of beam steering antennas, the antenna array further includes a first isolation portion, configured to isolate a signal interference between adjacent antennas. The first isolation portion may be a separately configured structure, or an isolation effect may be improved by configuring orthogonal polarization angles for the transmitting antenna and the receiving antenna.

Isolation of feeding is a second isolation portion disposed in the antenna array in order to prevent a problem that an output power of changed electrical signals transmitted by feeding portions of different channels of beam steering antennas is reduced due to a generation of a leak signal. In some examples, the second isolation portion is located between a feeding portion of the transmitting antenna and a feeding portion of the receiving antenna, and improves a signal isolation effect by offsetting the leaked signal within the region.

Figure 28:
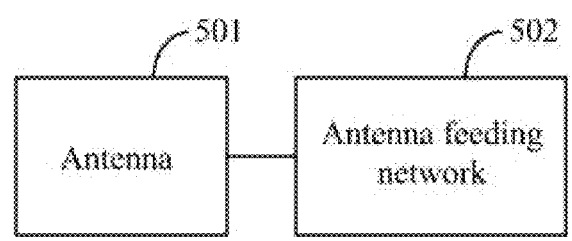
FIG. 28 illustrates schematically a structure of an antenna assembly.

An embodiment of the present disclosure further provides an antenna assembly. FIG. 28 is a schematic diagram of a structure of an antenna assembly according to an embodiment of the present disclosure. As can be seen from the figure, the antenna assembly includes: an antenna 501 as described in any embodiment of the present disclosure and an antenna feeding network 502; wherein the antenna feeding network 502 is configured to convert a received first radio frequency signal into second radio frequency signals whose transmission amplitudes and/or phases are not completely consistent, and input them to different feeding portions of the antenna respectively.

The antenna feeding network 502 may be one signal combiner, configured to convert the first radio frequency signal into the second radio frequency signals whose amplitudes and/or phases are not completely consistent to the first radio frequency signal, so as to input to a first feeding portion and a second feeding portion of the antenna. The first radio frequency signal comes from a signal transmitter in a chip. The antenna feeding network 502 is exemplified as a Hybrid or a power splitter. Taking the power splitter as an example, the antenna feeding network 502 receives a first radio frequency signal transmitted by one channel of signal transmitter, and distributes a power of the first radio frequency signal to form two channels of second radio frequency signals with different amplitudes and the same phase, which are respectively transmitted to the first feeding portion and the second feeding portion, so that a radiator of a microstrip line radiates in a radiation mode. Taking the Hybrid as an example, the antenna feeding network 502 is connected to a plurality of channels of signal transmitters to receive at least one channel of first radio frequency signal, wherein each channel of first radio frequency signal has a different amplitude and/or a different phase; a preset same phase difference or preset different phase differences are configured between a plurality of input ends and a plurality of output ends of the antenna feeding network 502, so that when a plurality of signal transmitters transmit at least one channel of radio frequency signal in different operating modes, a phase of each second radio frequency signal outputted by a plurality of output ends (also called transmitting ports) of the antenna feeding network 502 to the first feeding portion and the second feeding portion is different. For example, in any of the operating modes of the plurality of signal transmitters, phases of a plurality of second radio frequency signals are different. The operating mode of the signal transmitter corresponds to a radiation mode of a microstrip line radiator so as to provide signal probing of different radiation directions and/or radiation ranges, etc.

The above antenna feeding network is only an example. By using the antenna feeding network, there is a preset phase difference between phases of the radio frequency signals received by the first feeding portion and the second feeding portion of the antenna; and/or there is a preset amplitude difference between amplitudes of the radio frequency signals received by the first feeding portion and the second feeding portion of the antenna. In another embodiment, by using the antenna feeding network, the phases and/or the amplitudes of the plurality of radio frequency signals received by the first feeding portion and the second feeding portion of the antenna are set according to a preset combination configuration. The combination configuration is depended on an impedance structure and/or a phase shifter disposed in the antenna feeding network.

In an embodiment of the present disclosure, the antenna feeding network 502 may convert a first radio frequency signal into two radio frequency signals whose transmission amplitudes and/or phases are not completely consistent, and input the two radio frequency signals to the two feeding portions of the antenna respectively. The second radio frequency signals are a plurality of channels of radio frequency signals, and the antenna feeding network includes: a first transmitting port, connected to the first feeding portion of the antenna, and configured to transmit one channel of the second radio frequency signal thereof to the first feeding portion; a second transmitting port, connected to the second feeding portion of the antenna, and configured to transmit the other channel of second radio frequency signal thereof to the second feeding portion; both the first feeding portion and the second feeding portion adopt a biased feeding mode to excite the radiator of the antenna to radiate an electromagnetic wave beam of a high-order modal, which provides benefits for reconfiguration of a beam and improving a coverage range of the antenna.

An embodiment of the present disclosure further provides a measurement sensor, wherein the measurement sensor may be a radar sensor, and the measurement sensor may measure a physical quantity between the measurement sensor and a surrounding environment obstacle by using a probing signal wave transmitted by an antenna apparatus and a received echo signal wave by the antenna apparatus, for example, measuring at least one of a relative velocity, a relative angle, a relative distance, and a three-dimensional profile of the measured obstacle, or the like. The measurement sensor includes: an antenna apparatus and a signal transceiving apparatus connected with the antenna apparatus, wherein the signal transceiving apparatus is configured to transmit a probing signal wave through a transmitting antenna in the antenna apparatus and receive an echo signal wave through a receiving antenna in the antenna apparatus to output a baseband digital signal after processing the echo signal wave; the antenna apparatus includes a beam steering antenna as described in any of the aforementioned embodiments or an antenna array as described in any of the aforementioned embodiments; wherein, the echo signal wave is formed by a reflection of the probing signal wave by a probed object (also called a target object, or an obstacle, etc.).

Figure 29:
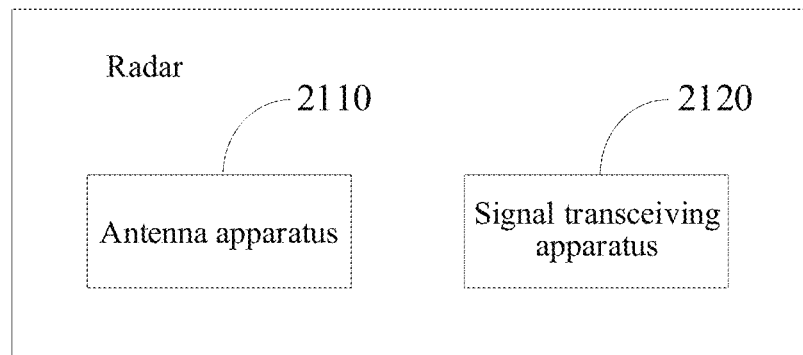
FIG. 29 illustrates schematically a structure of a radar.

FIG. 29 is a schematic diagram of a structure of a radar according to an embodiment of the present disclosure. As shown in FIG. 29, the radar includes: antenna 2110s and a signal transceiving apparatus 2120, wherein the antennas 2110 and the signal transceiving apparatus 2120 are connected with each other.

The radar according to the embodiment of the present disclosure may output a digital signal obtained by processing an echo electrical signal within a direction range based on the antennas included in the radar, and has the same beneficial effect as the antennas or the antenna array according to the aforementioned embodiment.

In addition, the signal transceiving apparatus includes a signal transmitter and a signal receiver. The antenna apparatus and the signal transceiving apparatus both determine a circuit structure according to requirements of probing a surrounding environment and signal processing by the radar, so as to send out a probing signal wave and receive an echo signal wave in a preset frequency band or a constant frequency, and perform signal processing on corresponding changed electrical signals.

The signal transmitter is configured to transmit a changed electrical signal corresponding to the probing signal wave to a transmit antenna in the antenna apparatus. For example, the signal transmitter frequency-modulates and/or phase-modulates a reference electrical signal provided by a signal source, and modulates it into a transmitting electrical signal with a changed current in a radio frequency band for outputting to the transmit antenna.

The signal receiver is configured to receive a received electrical signal (i.e., a changed electrical signal) outputted by a receiving antenna in an antenna array, and demodulate and filter the received electrical signal by using the transmitting electrical signal, so as to output a baseband digital signal of measurement information to be extracted.

Exemplarily, the measurement sensor may further include a signal processor, wherein the signal processor may be connected with the signal transceiver, and configured to extract measurement information from a received baseband digital signal through signal processing and output it. The signal processing includes outputting measurement information (also called a physical quantity) based on performing phase, frequency, time domain, and other digital signal processing calculation on at least one channel of baseband digital signal provided by at least one channel of receiving antenna. The measurement information includes, for example, at least one of the following: an angle, a distance, a velocity, a three-dimensional image, three-dimensional information of a tracked target, and the like.

An embodiment of the present disclosure further provides a radar radio frequency front end, wherein the radar radio frequency front end includes: an antenna array and a radar radio frequency transceiver.

The antenna array includes a plurality of microstrip antennas; a microstrip antenna includes: a radiation portion, a first feeding portion, and a second feeding portion; the first feeding portion and the second feeding portion feed in the radiation portion, so that the radiation portion forms radiation of a high-order mode under excitation of the first feeding portion or the second feeding portion; the radar radio frequency transceiver is coupled to the antenna array, and is configured to transmit a radio frequency transmitting signal to the first feeding portion and/or the second feeding portion of a corresponding antenna; and to receive a radio frequency receiving signal transmitted by the first feeding portion and/or the second feeding portion of the antenna; the radar radio frequency transceiver adjusts an amplitude and/or a phase of the transmitted radio frequency transmitting signal, and the microstrip antenna operates in different modes.

There is a preset phase difference between phases of a plurality of radio frequency signals received by the first feeding portion and the second feeding portion of the antenna; and/or there is a preset amplitude difference between amplitudes of a plurality of radio frequency signals received by the first feeding portion and the second feeding portion of the antenna. In another example, phases and/or amplitudes of various radio frequency signals received by the first feeding portion and the second feeding portion of the antenna are set according to a preset combination configuration.

In some other examples, the feeding portions of the microstrip antennas are connected to transmitting ends of different signal transmitters through transmission lines. In this example, a plurality of first radio frequency signals sent out by a plurality of signal transmitters are also called radio frequency transmit line signals. Under different operating modes of the plurality of signal transmitters, amplitudes and/or phases of a plurality of radio frequency transmit signals outputted by the plurality of signal transmitters are different. For example, two signal transmitters respectively send out two channels of radio frequency transmit signals with the same amplitude and a phase difference of ±90 degrees, and correspondingly, the radiation portions of the microstrip antennas generate beam steering angles of ±25°.

In some exemplary embodiments, the measurement sensor may combine antenna radiation requirements of a variety of dedicated measurement sensors with a structure of a reconfigurable antenna (which may reconfigure a beam, improving a coverage range of the antenna) shown in FIG. 18, or FIG. 25, or FIG. 27. The measurement sensor may include a radar radio frequency front end. For example, as shown in Table 1, feed_1 is a first feeding portion, feed_2 is a second feeding portion, an amplitude of 1 represents feeding, and an amplitude of 0 represents no feeding. The phase is a phase of a feeding current inputted into a radiation structure, in degrees.

TABLE 1

| | feed_1 port Amplitude | feed_2 port Amplitude | feed_1 port Phase | feed_2 port Phase |
|---|---|---|---|---|
| Mode 1 | 1 | 0 | 0 | 0 |
| Mode 2 | 0 | 1 | 0 | 0 |
| Mode 3 | 1 | 1 | 0 | 90 |
| Mode 4 | 1 | 1 | 0 | −90 |
| Mode 5 | 1 | 1 | 0 | 0 |
| Mode 6 | 1 | 1 | 0 | 180 |

When the feeding structure feed_1 or feed_2 is separately connected to a signal transceiver, the antenna operates in a similar mode to the antenna shown in FIG. 6, which is beneficial to a measurement of angle information by the measurement sensor. When the feed structures feed_1 and feed_2 are connected to the signal transceiver together and have a balanced power distribution, the antenna may generate electromagnetic waves in a single radiation main direction, which is beneficial to a measurement of distance information by the measurement sensor.

Figure 19:
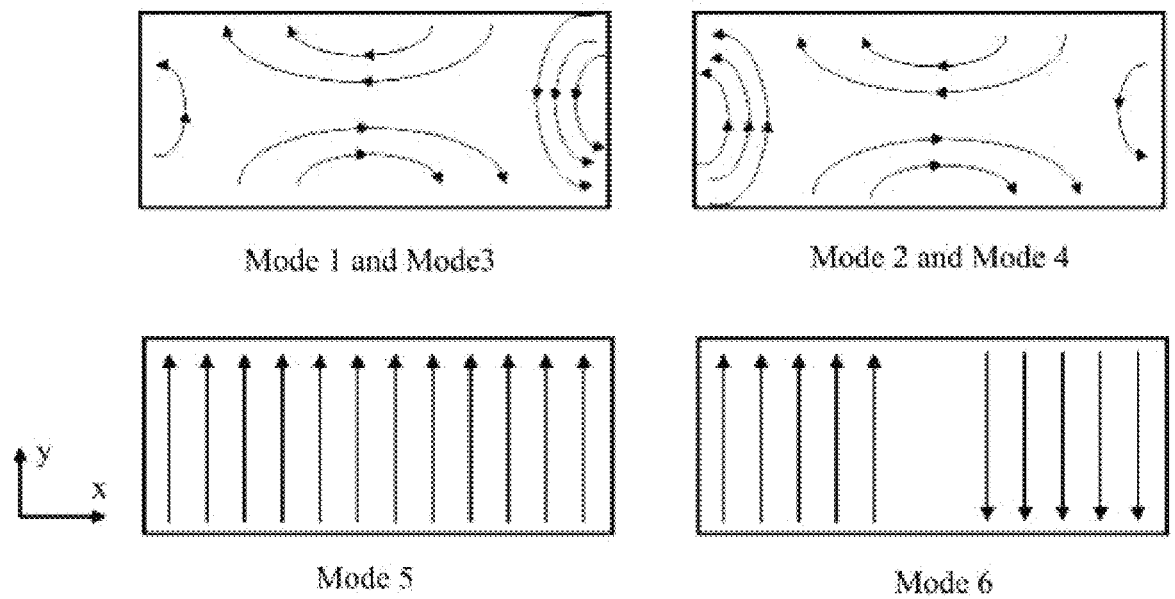
FIG. 19 illustrates schematically current distributions of the microstrip antenna of FIG. 18.
Figure 20A:
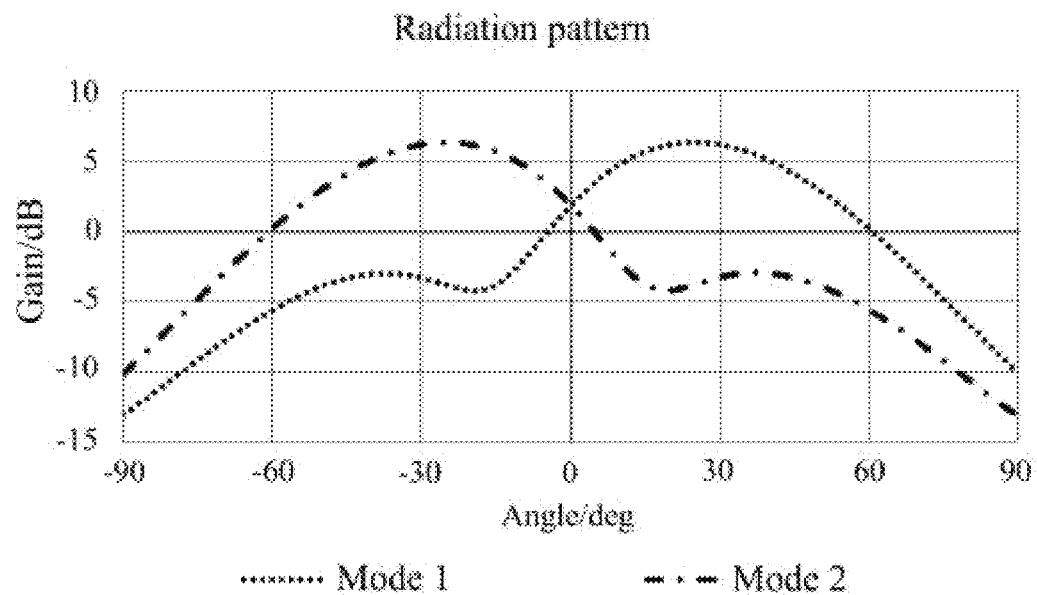
FIGS. 20A to 20C are shown as schematic diagrams of radiation directions of the antenna shown in FIG. 18 in different modes respectively.
Figure 20B:
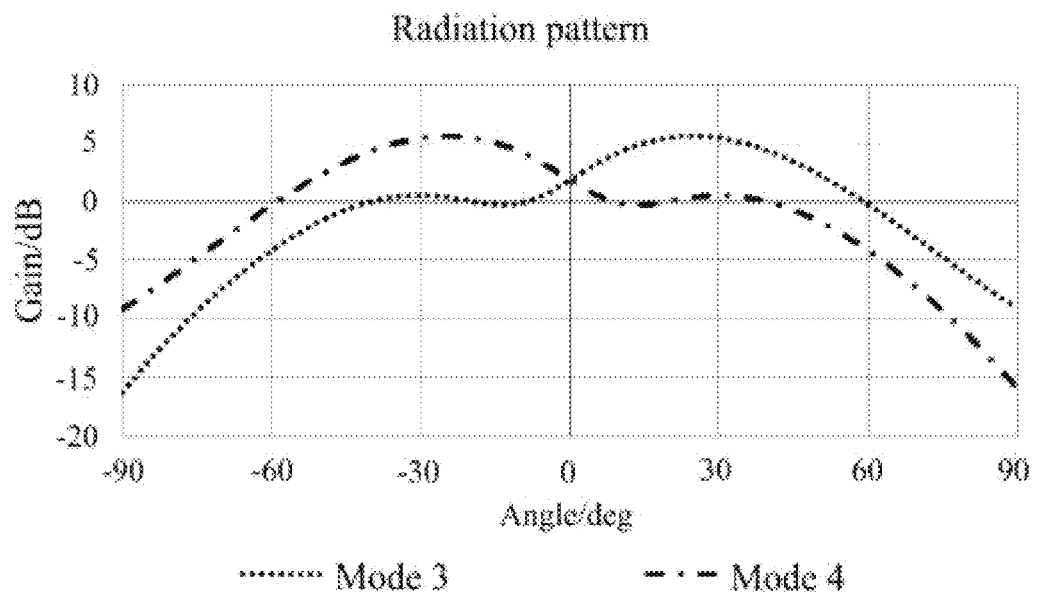
Figure 20C:
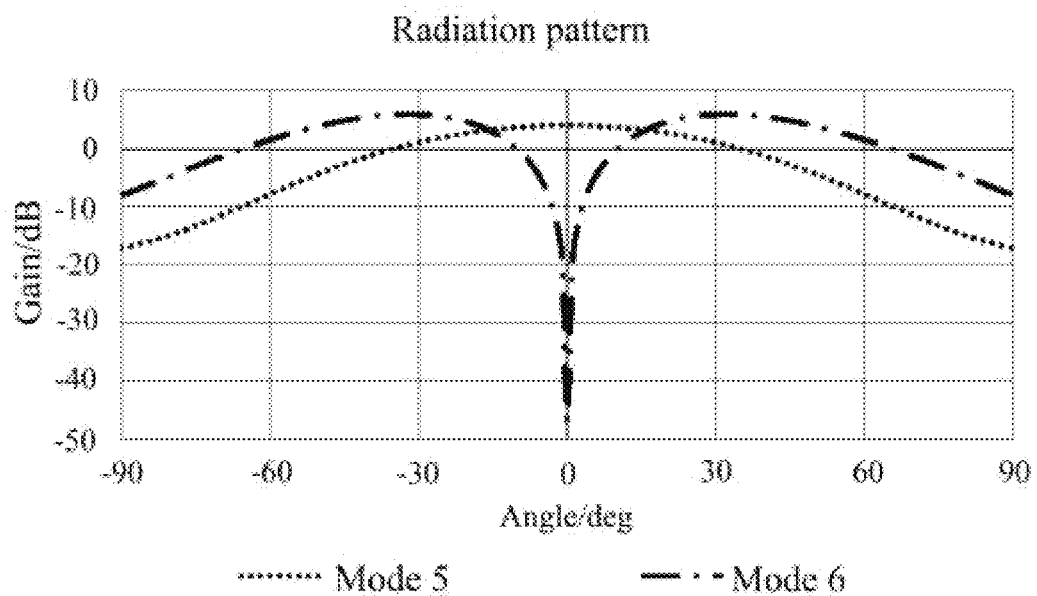

To explain characteristics of electromagnetic waves radiated by the antenna shown in FIG. 18 in the above six modes, see FIG. 19, and FIG. 20A to FIG. 20C, which respectively show schematic diagram of current distributions, and radiation directions in different modes of the antenna example shown in FIG. 18, wherein FIG. 19 is a schematic diagram of current distributions of the antenna shown in FIG. 18 in different modes, FIG. 20A is a schematic diagram of radiation directions of the antenna shown in FIG. 18 in two modes of Mode 1 and Mode 2, FIG. 20B is a schematic diagram of radiation directions of the antenna shown in FIG. 18 in two modes of Mode 3 and Mode 4, and FIG. 20C is a schematic diagram of radiation directions of the antenna shown in FIG. 18 in two modes of Mode 5 and Mode 6.

Take the structure of the antenna shown as follows as an example: two feeding structures feed_1 and feed_2 are connected to two different feeding positions on the first long edge of the radiation structure at the same side, and a distance between them is, for example, 0.6-0.9 times the edge length W of the first long edge. Mode 1 and Mode 2 provide beam steering angles of 25° and −25° respectively. As shown in FIG. 20A, Mode 1 is that port feed_1 is fed and port feed_2 is disconnected; Mode 2 is that port feed_2 is fed and port feed_1 is disconnected; at this time, the port excites the TM11 mode of the rectangular radiation patch, and the left and the right of a radiation pattern are also asymmetric due to an asymmetry of a current distribution; at the same time, it can be seen from the current distribution that a polarization direction of the antenna is a y-axis direction.

As shown in FIG. 20B, Mode 3 and Mode 4 provide beam steering angles of 25° and −25°, respectively. Different from Mode 1 and Mode 2, Mode 3 is that port feed_1 and port feed_2 are fed simultaneously, and a phase of port feed_2 has a deviation of 90° relative to a phase of port feed_1; Mode 4 is that port feed_1 and port feed_2 are fed simultaneously, and the phase of port feed_2 has a deviation of −90° relative to the phase of port feed_1; an advantage brought by dual-port simultaneous feeding is a power synthesis. For radar applications, compared with Mode 1 and Mode 2, a power of Mode 3 and Mode 4 increases by 3 dB, and an equivalent omnidirectional radiation power (EIRP) also increases by 3 dB.

In addition, it can further be seen from a diagram of current distributions of FIG. 19 that the TM11 mode is excited by Mode 3 and Mode 4. Because of an asymmetry of a current distribution, the left and the right of a radiation pattern are also asymmetric; at the same time, it can be seen from the current distribution that a polarization direction of the antenna is the y-axis direction.

As shown in FIG. 20C, a radiation pattern of Mode 5 presents a broadside radiation characteristic, and a maximum radiation direction points to a direction of 0°. In Mode 5, port feed_1 and port feed_2 are fed simultaneously, and phases of port feed_1 and port feed_2 are the same; it can be seen from the current distribution in FIG. 19 that at this time a surface current of a rectangular radiation patch presents a characteristic of the TM01 mode, and the antenna has polarization in the y-axis direction. A main beam of a radiation pattern of Mode 6 points to ±30°, while it presents null steering in a direction of 0°; In Mode 6, port feed_1 and port feed_2 are fed simultaneously, and phases of port feed_1 and port feed_2 are inverted; it can be seen from the current distribution that currents at two sides are inverted.

Using the above six modes, the signal transmitter of the measurement sensor may provide a digital phase modulation mechanism, so as to combine signal coverage advantages of a variety of sensors such as an angle sensor, a distance sensor, a target tracking sensor, and the like.

According to the technical solution of the present embodiment, the antenna and the antenna feeding network described in the embodiments of FIGS. 18, 25, and 27 are provided; wherein, the antenna feeding network is configured to convert a received first radio frequency signal into second radio frequency signals whose transmission amplitudes and/or phases are not completely consistent to the first radio frequency signal, and input them to different feeding portions of the antenna respectively. Radiation directions in six different modes can be generated, thus combining signal coverage advantages of a variety of sensors such as the angle sensor, the distance sensor, the target tracking sensor, and the like.

Figure 30:
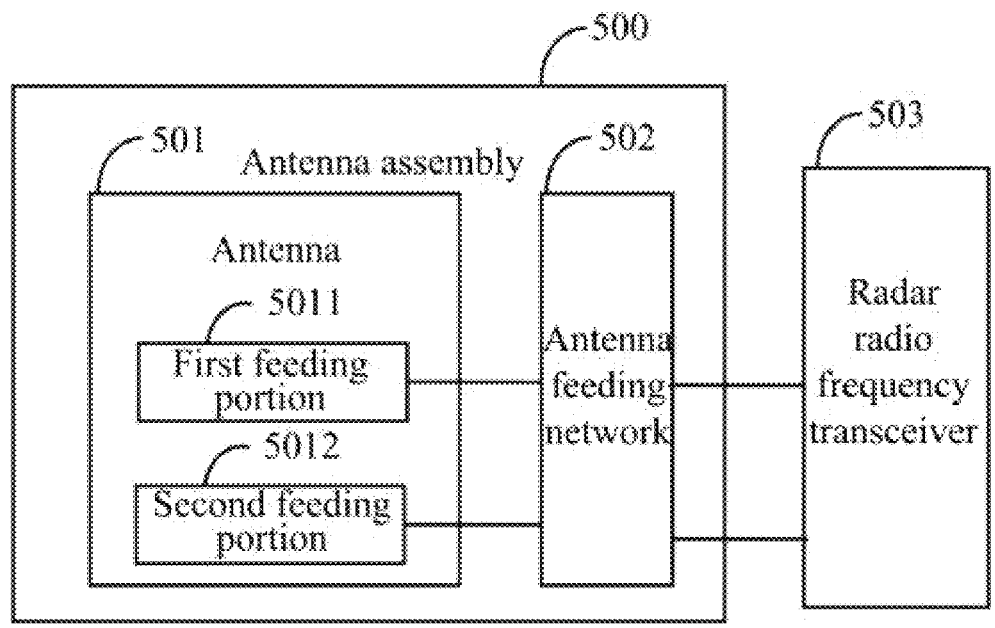
FIG. 30 illustrates schematically a structure of a radar radio frequency front end.

FIG. 30 is a schematic diagram of a structure of a radar radio frequency front end according to an embodiment of the present disclosure. It can be seen from the figure that the radar radio frequency front end includes: an antenna assembly 500 having two feeding portions as in the embodiments of FIGS. 18, 25, and 27 and a radar radio frequency transceiver 503, wherein an antenna feeding network 502 of the antenna assembly 500 is connected between an antenna 501 of the antenna assembly 500 and the radar radio frequency transceiver 503, and the antenna feeding network 500 is configured to transmit a signal transmitted by the radar radio frequency transceiver 503 to a first feeding portion 5011 and a second feeding portion 5012 of the antenna 501, and to transmit a signal received by the first feeding portion 5011 and the second feeding portion 5012 of the antenna 501 to the radar radio frequency transceiver 503.

In some examples, the antenna feeding network 502 may convert the signal sent by the radar radio frequency transceiver 503 into two radio frequency signals whose transmission amplitudes and/or phases are not completely consistent, and input the two radio frequency signals to the first feeding portion 5011 and the second feeding portion 5012 of the antenna 501, respectively.

The antenna feeding network 500 is configured to convert amplitudes and phases of the signal transmitted by the radar radio frequency transceiver 503 to the first feeding portion 5011 and the second feeding portion 5012, so that the antenna 501 operates in different modes.

Amplitudes and phases of signals received by the first feeding portion 5011 and the second feeding portion 5012 will affect the operating mode of the antenna 501. Each of the first feeding portion 5011 and the second feeding portion 5012 excites, in an offset feed mode, the antenna 501 to operate in different modes.

The amplitudes include a first amplitude and a second amplitude, and the phases include a first phase, a second phase, a third phase, and a fourth phase; when the first feeding portion 5011 is input a radio frequency signal of the second amplitude and the first phase, and the second feeding portion 5012 is input a radio frequency signal of the first amplitude and the first phase, the antenna 501 operates in Mode 1; when the first feeding portion 5011 is input a radio frequency signal of the first amplitude and the first phase, and the second feeding portion 5012 is input a radio frequency signal of the second amplitude and the first phase, the antenna 501 operates in Mode 2; when the first feeding portion 5011 is input a radio frequency signal of the second amplitude and the first phase, and the second feeding portion 5012 is input a radio frequency signal of the second amplitude and the second phase, the antenna 501 operates in Mode 3; when the first feeding portion 5011 is input a radio frequency signal of the second amplitude and the first phase, and the second feeding portion 5012 is input a radio frequency signal of the second amplitude and the fourth phase, the antenna 501 operates in Mode 4; when the first feeding portion 5011 is input a radio frequency signal of the second amplitude and the first phase, and the second feeding portion 5012 is input a radio frequency signal of the second amplitude and the first phase, the antenna 501 operates in Mode 5; when the first feeding portion 5011 is input a radio frequency signal of the second amplitude and the first phase, and the second feeding portion 5012 is input a radio frequency signal of the second amplitude and the third phase, the antenna 501 operates in Mode 6.

The first amplitude may be 0, the second amplitude may be 1, the first phase may be 0°, the second phase may be 90°, the third phase may be 180°, and the fourth phase may be −90°, which is not limited by the embodiment of the present disclosure.

Exemplarily, an amplitude of 1 indicates feeding, and an amplitude of 0 indicates no feeding.

For the technical solution of the present embodiment, an antenna assembly 500 having a plurality of feeding portions and a radar radio frequency transceiver 503 are provided, wherein an antenna feeding network 502 of the antenna assembly 500 is connected between an antenna 501 of the antenna assembly 500 and the radar radio frequency transceiver 503, and the antenna feeding network 502 is configured to transmit a signal transmitted by the radar radio frequency transceiver 503 to a first feeding portion 5011 and a second feeding portion 5012 of the antenna 501, and to transmit a signal received by the first feeding portion 5011 and the second feeding portion 5012 of the antenna 501 to the radar radio frequency transceiver 503. The antenna feeding network 502 can convert a signal generated by the radar radio frequency transceiver 503 into two radio frequency signals whose transmission amplitudes and/or phases are not completely consistent, and input them to the first feeding portion 5011 and the second feeding portion 5012 of the antenna respectively, so that the first feeding portion 5011 and the second feeding portion 5012 excite, in a biased feeding mode, a radiator of the antenna 501 to radiate an electromagnetic wave beam of high-order mode.

In some other examples, the above antenna array is connected correspondingly with a transmitting end of a signal transmitter, so that by the signal transmitter generating, in different operating modes, radio frequency transmission signals whose amplitudes and/or phases are different, radiation portions of various microstrip antennas in the antenna array are allowed to generate electromagnetic waves in corresponding radiation modes.

Another embodiment of the present disclosure further provides an electronic device, which includes: a radar radio frequency front end according to any embodiment of the present disclosure; in different operating modes, an antenna in the radar radio frequency front end sends out a probing signal wave and receives an echo signal wave, and processes the echo signal wave into a baseband digital signal according to the probing signal wave and outputs it; and a signal processing apparatus, connected with the radar radio frequency front end, and configured to perform signal processing of the baseband digital signal for determining measurement information with an object.

An embodiment of the present disclosure further provides a vehicle configured with the above measurement sensor. The vehicle further includes a vehicle shell, a drive system of the vehicle, and a control system of the vehicle.

The vehicle shell is disposed with at least one mounting hole. The mounting hole is configured to assemble the above measurement sensor such as the radar. The mounting hole is disposed at one or more positions on the vehicle shell according to a requirement of the control system of the vehicle for measurement information provided by the measurement sensor. For example, there are a plurality of mounting holes and the plurality of mounting holes are disposed at four body angle positions of the vehicle shell, and/or rearview mirror positions, etc.; and they may alternatively be disposed directly in front of and behind the vehicle, and/or at vehicle door positions, etc.

The driving system of the vehicle is configured to drive the whole vehicle to move, such as forward, backward, turning, or the like. An example of the drive system includes: an engine, a transmission gear, and wheels, etc.

The control system of the vehicle is connected with the measurement sensor and is configured to provide warning information and/or control the drive system of the vehicle to perform a safety emergency operation according to the measurement information.

Herein, the control system of the vehicle includes a radar warning device of the vehicle; it may even include an automatic assisted driving system. Taking the measurement sensor being connected to the radar warning device as an example, the measurement sensor is configured at a body angle position behind the vehicle, and the measurement sensor may probe obstacle information within a range of approximately 90° from a body side of the vehicle to a rear of the vehicle. In a process of reversing, a signal transmitter in the measurement sensor may be switched in different operating modes to probe objects in different ranges, and feeds back probed measurement information to the radar warning device. When the radar warning device determines that there is an obstacle within a corresponding range according to the measurement information provided by the measurement sensor, it provides corresponding warning information, such as a buzzing sound, an image, or the like. Taking the measurement sensor being connected to the automatic assisted driving system as an example, the measurement sensor is configured at the body angle position behind the vehicle, and the measurement sensor probes objects in different ranges by adjusting different operating modes of the signal transmitter, for example, the measurement sensor may probe obstacle information within a range of approximately 90° from the body side of the vehicle to the rear of the vehicle. In a process of reversing, when the automatic assisted driving system determines that there is an obstacle within a corresponding range according to the measurement information provided by the measurement sensor, it controls the vehicle to slow down or even stop.

The technical solution of the present embodiment provides an electronic device including the radar radio frequency front end. The antenna in the radar radio frequency front end sends out a probing signal wave and receives an echo signal wave through a mounting hole on a device main body; a control system of the electronic device is connected with the radar radio frequency front end, and is configured to control a drive system of the electronic device to perform a safety emergency operation according to information provided by the radar radio frequency front end.

In the embodiment of the present disclosure, by adjusting a radiation structure, a feeding structure, and their connection relationship, it is achieved that electromagnetic conversion of electromagnetic waves with a plurality of main radiation directions on a metal patch with a single radiation structure by utilizing a characteristic of different current distributions. Therefore, a situation in antennas of prior art that compositely using of a plurality of channels of antennas to generate radiation is changed, and sizes of the antenna and an antenna array are effectively reduced.

The above is only a preferred embodiment of the present disclosure and a technical principle applied. It will be understood by those skilled in the art that the present disclosure is not limited to the particular embodiments described herein and that various significant changes, readjustments, and substitutions can be made to those skilled in the art without departing from the scope of the present application. Therefore, although the present disclosure has been described in more detail by the above embodiments, the present disclosure is not limited to the above embodiments, and may also include more other equivalent embodiments without departing from the idea of the present disclosure, while the scope of the present disclosure is determined by the scope of the appended claims.

What is claimed is:

1. A microstrip antenna, comprising: a dielectric layer, a metal layer disposed at a side of the dielectric layer, and a ground plane layer disposed at a side of the dielectric layer away from the metal layer, wherein:
   the metal layer comprises a first radiation patch and a feeding portion;
   the first radiation patch at least comprises a long side edge, and a short side edge adjacent to the long side edge, a length of the long side edge is determined based on an operating wavelength of the microstrip antenna, a length of the short side edge is less than the length of the long side edge;
   the feeding portion is coupled between a center position of the long side edge and a short side edge of the first radiation patch, and the feeding portion is configured to transmit a high frequency signal to the first radiation patch or to transmit a space radiation signal received by the first radiation patch; and
   the microstrip antenna further comprises a second radiation patch provided at a single side of the first radiation patch and fed by the first radiation patch in an inductive coupling mode, wherein the second radiation patch is disposed at a side of the short side edge of the first radiation patch and spaced from the short side edge by a preset distance, and sizes of the second radiation patch and the first radiation patch are identical, wherein the short side edge disposed with the second radiation patch is away from the feeding portion.

2. The microstrip antenna of claim 1, wherein: the feeding portion is electrically connected with the first radiation patch, to allow the feeding portion and the first radiation patch to be connected for feeding.

3. The microstrip antenna of claim 1, further comprising: a matching structure, coupled between the feeding portion and the first radiation patch for impedance matching.

4. The microstrip antenna of claim 1, wherein: a portion between the center position of the long side edge and the short side edge of the first radiation patch is recessed in a groove formed by the feeding portion, to allow the feeding portion and the first radiation patch to be coupled for feeding.

5. The microstrip antenna of claim 4, wherein an offset feed distance between the feeding portion and a center position of the first radiation patch is greater than zero.

6. The microstrip antenna of claim 1, wherein the feeding portion comprises a first feeding portion and a second feeding portion; wherein:
   the first feeding portion is located at a side of a symmetrical center of the long side edge of the first radiation patch, and the second feeding portion is located at another side of the long side edge of the first radiation patch, to allow the first radiation patch to be capable of generating radiation of high-order mode under excitation of the first feeding portion or the second feeding portion; and the first feeding portion and/or the second feeding portion are configured to transmit a radio frequency transmit signal to the first radiation patch; or the first feeding portion and/or the second feeding portion are configured to output a radio frequency receiving signal received by the first radiation patch.

7. The microstrip antenna of claim 1, wherein an offset feed distance between the feeding portion and a center position of the first radiation patch is greater than a quarter of the length of the long side edge.

8. The microstrip antenna of claim 1, further comprising: a plurality of metal via holes, which is opposite to a side of the feeding portion, and is disposed in the first radiation patch, the metal via holes are electrically connected to the first radiation patch and the ground plane layer.

9. The microstrip antenna of claim 1, wherein in a millimeter wave band, lengths of long side edges of the first radiation patch and the second radiation patch are both 2.4 mm, and an angle θ corresponding to a maximum gain E(θ) of the microstrip antenna is in (−53°±Δ), wherein Δ is an angle error.

10. An antenna array, comprising: a plurality of microstrip antennas, wherein
each microstrip antenna comprises: a dielectric layer, a metal layer disposed at a side of the dielectric layer, and a ground plane layer disposed at a side of the dielectric layer away from the metal layer, wherein:
the metal layer comprises a first radiation patch and a feeding portion;
the first radiation patch at least comprises a long side edge, and a short side edge adjacent to the long side edge, a length of the long side edge is determined based on an operating wavelength of the microstrip antenna, a length of the short side edge is less than the length of the long side edge;
the feeding portion is coupled between a center position of the long side edge and a short side edge of the first radiation patch, and the feeding portion is configured to transmit a high frequency signal to the first radiation patch or to transmit a space radiation signal received by the first radiation patch;
each microstrip antenna further comprises a second radiation patch provided at a single side of the first radiation patch and fed by the first radiation patch in an inductive coupling mode, wherein the second radiation patch is disposed at a side of the short side edge of the first radiation patch and spaced from the short side edge by a preset distance, and sizes of the second radiation patch and the first radiation patch are identical, wherein the short side edge disposed with the second radiation patch is away from the feeding portion; and
feeding portions of the plurality of microstrip antennas are connected.

11. The antenna array of claim 10, wherein that feeding portions of the plurality of microstrip antennas are connected comprises:
each feeding portion of a microstrip antenna and a first radiation patch of the microstrip antenna where the feeding portion is located are connected for feeding, and each feeding portion of the microstrip antenna is connected to a first radiation patch of another microstrip antenna; or first feeding portions and/or second feeding portions of the plurality of microstrip antennas are connected by first radiation patches of microstrip antennas at adjacent positions.

12. The antenna array of claim 10, wherein that feeding portions of the plurality of microstrip antennas are connected comprises: each feeding portion of a microstrip antenna and a first radiation patch of the microstrip antenna where the feeding portion is located are connected for feeding, and the feeding portions of the plurality of microstrip antennas are respectively connected to a transmission line; or first feeding portions of the plurality of microstrip antennas are directly connected, and/or second feeding portions of the plurality of microstrip antennas are directly connected.

13. The antenna array of claim 10, wherein that feeding portions of the plurality of microstrip antennas are connected comprises: each feeding portion of a microstrip antenna and a first radiation patch of the microstrip antenna where the feeding portion is located are coupled for feeding, and the feeding portions of the plurality of microstrip antennas are connected in series; or first feeding portions of the plurality of microstrip antennas are inductively coupled through a first transmission line, and second feeding portions of the plurality of microstrip antennas are inductively coupled through a second transmission line; wherein the first transmission line is disposed at a side of each first feeding portion away from a symmetrical center of a long side edge of a first radiation patch of the microstrip antenna where the first feeding portion is located, and the second transmission line is disposed at a side of each second feeding portion away from the symmetrical center of the long side edge of a first radiation patch of the microstrip antenna where the second feeding portion is located.

14. A radar sensor, comprising:
an antenna apparatus, comprising an antenna, wherein the antenna comprises: a dielectric layer, a metal layer disposed at a side of the dielectric layer, and a ground plane layer disposed at a side of the dielectric layer away from the metal layer, wherein:
the metal layer comprises a first radiation patch and a feeding portion;
the first radiation patch at least comprises a long side edge, and a short side edge adjacent to the long side edge, a length of the long side edge is determined based on an operating wavelength of the microstrip antenna, a length of the short side edge is less than the length of the long side edge;
the feeding portion is coupled between a center position of the long side edge and a short side edge of the first radiation patch, and the feeding portion is configured to transmit a high frequency signal to the first radiation patch or to transmit a space radiation signal received by the first radiation patch;
the antenna further comprises a second radiation patch provided at a single side of the first radiation patch and fed by the first radiation patch in an inductive coupling mode, wherein the second radiation patch is disposed at a side of the short side edge of the first radiation patch and spaced from the short side edge by a preset distance, and sizes of the second radiation patch and the first radiation patch are identical, wherein the short side edge disposed with the second radiation patch is away from the feeding portion; and the antenna apparatus further comprises a signal transceiving apparatus, coupled to the antenna or the antenna array, and configured to transmit a probe signal wave using the antenna or the antenna array, to receive an echo signal wave using the antenna or the antenna array, and to mix and sample the echo signal wave using the probe signal wave to output a baseband digital signal; wherein the echo signal wave is formed by a reflection of the probing signal wave by an object.

15. The radar sensor of claim 14, wherein:

the first radiation patch comprises a first radiation region and a second radiation region;

the feeding portion is configured to feed to the first radiation patch from a feeding position of the first radiation patch;

the first radiation region and the second radiation region are determined according to a difference of current distribution in the first radiation patch due to the feeding of the feeding position; and under excitation of the feeding portion, the first radiation region and the second radiation region generate probing signal waves in a preset radiation angle range.

16. A vehicle, comprising: a vehicle shell, the radar sensor of claim 14, and a control system of the vehicle; wherein the radar sensor is fixed on the vehicle shell and comprises an antenna array; the antenna array is configured to send out a probing signal wave and receive an echo signal wave; the radar sensor is configured to measure measurement information of the vehicle and an obstacle within a preset radiation angle range in a surrounding environment according to the probing signal wave and the echo signal wave, and output the measurement information; and the control system of the vehicle is connected with the radar sensor and is configured to provide warning information and/or control a drive system of the vehicle to perform a safety emergency operation according to the measurement information.

17. The vehicle of claim 16, wherein the feeding portion comprises a first feeding portion and a second feeding portion; wherein:

the first feeding portion is located at a side of a symmetrical center of the long side edge of the first radiation patch, and the second feeding portion is located at another side of the long side edge of the first radiation patch, to allow the first radiation patch to be capable of generating radiation of high-order mode under excitation of the first feeding portion or the second feeding portion; and the first feeding portion and/or the second feeding portion are configured to transmit a radio frequency transmit signal to the first radiation patch; or the first feeding portion and/or the second feeding portion are configured to output a radio frequency receiving signal received by the first radiation patch.

18. The vehicle of claim 16, wherein an offset feed distance between the feeding portion and a center position of the first radiation patch is greater than a quarter of the length of the long side edge.

19. The vehicle of claim 16, wherein the microstrip antenna further comprises: a plurality of metal via holes, disposed in the first radiation patch relative to a side at which the feeding portion is disposed, the metal via holes being electrically connected to the first radiation patch and the ground layer.

* * * * *